United States Patent
Chen et al.

(10) Patent No.: US 11,438,407 B2
(45) Date of Patent: Sep. 6, 2022

(54) SERVICE REGISTRATION BASED ON SERVICE CAPABILITIES REQUIREMENTS AND PREFERENCES

(71) Applicant: CONVIDA WIRELESS, LLC, Wilmington, DE (US)

(72) Inventors: Zhuo Chen, Claymont, DE (US); Dale N. Seed, Allentown, PA (US); Quang Ly, North Wales, PA (US); Catalina Mihaela Mladin, Hatboro, PA (US); William Robert Flynn, IV, Schwenksville, PA (US); Rocco Di Girolamo, Laval (CA); Shoshana Loeb, Philadelphia, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/650,886

(22) PCT Filed: Sep. 28, 2018

(86) PCT No.: PCT/US2018/053411
§ 371 (c)(1),
(2) Date: Mar. 26, 2020

(87) PCT Pub. No.: WO2019/067892
PCT Pub. Date: Apr. 4, 2019

(65) Prior Publication Data
US 2020/0287963 A1    Sep. 10, 2020

Related U.S. Application Data

(60) Provisional application No. 62/565,750, filed on Sep. 29, 2017.

(51) Int. Cl.
*H04L 67/1008* (2022.01)
*H04L 67/51* (2022.01)
*H04W 4/70* (2018.01)

(52) U.S. Cl.
CPC .......... *H04L 67/1008* (2013.01); *H04L 67/51* (2022.05); *H04W 4/70* (2018.02)

(58) Field of Classification Search
CPC .......................... H04L 67/1008; H04L 67/16
See application file for complete search history.

(56) References Cited

U.S. PATENT DOCUMENTS

| 2010/0100525 A1* | 4/2010 | Huang | H04L 67/02 |
| | | | 707/609 |
| 2013/0066965 A1* | 3/2013 | Foti | H04L 67/2833 |
| | | | 709/204 |

(Continued)

FOREIGN PATENT DOCUMENTS

| WO | 2011/112683 A1 | 9/2011 |
| WO | 2016/007813 A1 | 1/2016 |

(Continued)

OTHER PUBLICATIONS

"OIC Core Specification V1.1.1 Part 1", Open Connectivity Foundation (OCF), Copyright 2016, 151 pages.

(Continued)

*Primary Examiner* — Benjamin M Thieu
(74) *Attorney, Agent, or Firm* — BakerHostetler

(57) ABSTRACT

A registrar entity, such as a service layer gateway, obtains the service capabilities requirements or preferences of a new registree entity, such as an application, and only accepts a registration of the registree if the registrar has sufficient remaining service capacities to meet the service capabilities requirements or preferences of the registree entity while ensuring that the provision of support to existing registree entities is not impacted. If the registrar lacks the capabilities (Continued)

to satisfy the requirements or preferences, it may contact a server to identify another registrar which has the capabilities. Updates to requirements or preference may originate at any node, e.g., at a user equipment device or a service.

20 Claims, 19 Drawing Sheets

(56) References Cited

U.S. PATENT DOCUMENTS

| | | | | |
|---|---|---|---|---|
| 2014/0330929 | A1* | 11/2014 | Dong | H04W 4/70 709/217 |
| 2015/0310446 | A1* | 10/2015 | Tuchman | G06Q 30/016 705/304 |
| 2015/0341837 | A1* | 11/2015 | Zhao | H04W 36/14 455/436 |
| 2017/0048336 | A1* | 2/2017 | Novo Diaz | H04L 67/02 |
| 2018/0091506 | A1* | 3/2018 | Chow | G06Q 20/085 |

FOREIGN PATENT DOCUMENTS

| | | | |
|---|---|---|---|
| WO | 2016/164899 | A1 | 10/2016 |
| WO | 2017/040749 | A1 | 3/2017 |

OTHER PUBLICATIONS

ETSI 102 690 V2.0.14 Technical Specification, Machine-to-Machine Communications (M2M); Functional Architecture, Jul. 2013, 332 pages.

OneM2M Technical Specification TS-0001 V3.4.0, "Functional Architecture", Feb. 2017, 475 pages.

* cited by examiner

Service Requirement Profile

Application 1: Category 2 Camera

Requirements:
    Storage : 58 GB;
    Service Availability: 99%

Application 2: Category 1 Sensor

Requirement:
    Storage : 500 KB

FIG. 14

Service Capacity Information

Gateway 1:
    Storage: 500MB in use, 9.5GB available
    Registered Devices: 100 Category 1 Sensors
    Current Average Request Processing Time: 100 ms
    Current Service Request Rate: 100 per second Gateway 2:
    Storage: 10GB in use, 10GB available
    Registered Devices: 10 Category 2 Camera
    Current Average Request Processing Time: 10 ms
    Current Service Request Rate: 1000 per second

FIG. 15

SERVICE REGISTRATION BASED ON SERVICE CAPABILITIES REQUIREMENTS AND PREFERENCES

CROSS-REFERENCE TO RELATED APPLICATIONS

This application is the National Stage Application of International Patent Application No. PCT/US2018/053411 filed Sep. 28, 2018, which claims the benefit of U.S. Provisional Application No. 62/565,750, filed on Sep. 29, 2017, entitled "Service registration based on service capabilities requirements and preferences" (Chen, et al.), the content of which is hereby incorporated by reference in its entirety.

BACKGROUND

Machine-To-Machine (M2M), Internet-of-Things (IoT), and Web-of-Things (WoT) network deployments may employ unicast and multicast communications between nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks.

SUMMARY

Registration to service layers may be improved by tracking service capability requirements and preferences. For example, a service layer registrar, such as a gateway, may obtain a service capability preference of a service layer registree entity. The registree may be, for example, a user equipment device or application residing on a user equipment device. The registrar may then determine, based at least in part on the service capability preference and capacities available to the registrar, whether to register the service layer registree entity.

For example, before registering an entity, the registrar may wish to review the amount of computer memory and central processing bandwidth available to the registrar vis-a-vis the frequency and complexity of transactions and other operations that the registree is hoping the registrar will support. From this, the registrar can assess the potential impact on the registrar's support of other registered entities, and determine thereby whether to register the service layer registree entity.

If the register is confident that it can provide the service capabilities requested, the registrar may then register the requesting entity and optionally reserve, based upon the service capability preference or requirements, operations resources sufficient to service the registree.

Where the registrar feels that it lacks the capabilities to support the requested level of operations, it may send a request to a server asking to transfer the registration to a new registrar. The initial registrar may then receive a response from the server identifying a registrar gateway for use by the requesting registree.

The registrar may receive from any entity a registration request that includes a service capability preference or requirement. For example, the request may come from a user equipment or a server. Similarly, registrar may receive from any entity a registration request including an updated service capability preference or requirement. Updated requests may be processed in a manner analogous to the processing new requests.

Like registrars, registrees and servers may be specially adapted to process service capability preferences and requirements in registration requests and in communications seeking alternative registrars.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings.

FIG. 14 shows an example graphical user interface for an M2M/IoT server, such as a oneM2M IN-CSE, to configure and/or display service requirement profile of applications.

FIG. 15 shows an example graphical user interface for M2M/IoT servers and gateways to display service capacity information.

DETAILED DESCRIPTION

Figure 1:
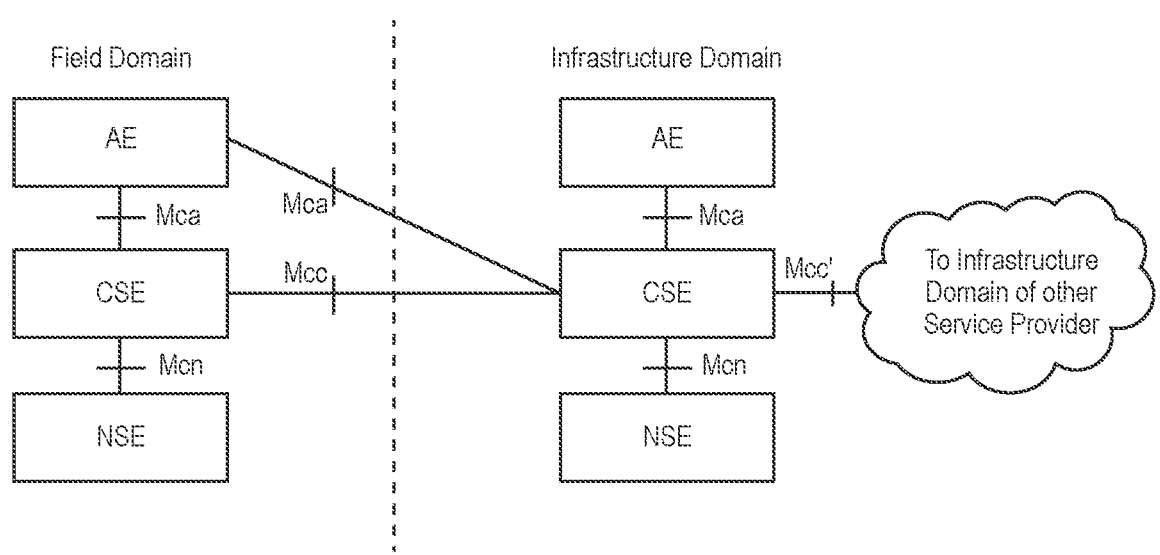
FIG. 1 is a block diagram illustrating a oneM2M architecture.

In an M2M/IoT service layer (SL), SL gateways, e.g., a MN-CSE in oneM2M, are usually deployed locally or at the edge of a network to provide low latency service. A device registers to an SL gateway to provide and/or use services. However, these SL gateways usually have limited service capacities. Without properly managing devices that are registering and using services hosted on the SL gateway, an SL gateway may become overloaded such that it cannot provide required services to all of its devices in a manner which meets their service preferences or requirements. In this disclosure, methods are proposed to manage SL registrations, such that SL gateways not only continue to provide the required level of available services for registered devices, but also are able to provide service for new devices when service capacity exists.

An enhanced SL registration procedure is proposed wherein the level of support of an existing registree is not impacted by a new registree registering to the system. In the proposed procedure, a registrar entity (e.g., an SL gateway) obtains the service capabilities requirement of a new registree entity (e.g., an application), and only accepts the registration if it has sufficient remaining service capacities that meet the service preferences or requirements of the registree entity and ensure the level of support of existing registree entities is not impacted.

An enhanced SL registration procedure is proposed to fulfill the service capabilities requirement or preference of new registering applications. In the proposed procedure, SL Entities obtain the service capabilities requirements and preferences of a new registree entity, and select a registrar entity that not only fulfils the service capabilities requirement but meets the service preference of the registree entity.

Enhanced SL registration management procedures are proposed when the service preferences or requirements associated with a registree entity is updated after the registration.

TABLE 1

| Abbreviations | |
| --- | --- |
| ACP | Access Control Policy |
| ADN | Application Dedicated Node |
| AE | Application Entity |
| API | Application Programming Interfaces |
| ASN | Application Service Node |
| CSE | Common Service Entity |
| CSF | Common Service Function |
| FQDN | Fully Qualified Domain Name |
| IN | Infrastructure Network |
| IoT | Internet of Things |
| IP | Internet Protocol |
| M2M | Machine to Machine |
| MN | Middle Node |
| NoDN | Non-oneM2M Node |
| NSE | Network Service Entity |
| PoA | Point of Access |
| ROA | Resource Oriented Architecture |
| SCRP | Service Capabilities Requirement Profile |
| SCPP | Service Capabilities Preference Profile |
| SL | Service Layer |

TABLE 1-continued

| Abbreviations | |
| --- | --- |
| URI | Uniform Resource Identifier |
| URL | Uniform Resource Locator |

The term "M2M/IoT SL" generally refers to a software middleware layer that supports value-added services for M2M/IoT applications and devices through a set of Application Programming Interfaces (APIs) and underlying networking interfaces.

The term "M2M/IoT application" generally refers to an application targeting a particular M2M/IoT use case (e.g., eHealth, smart energy, or home automation).

The term "registrar" generally refers to an SL entity to which another SL entity has registered.

The term "registree" generally refers to an SL entity that registers with another SL entity. For example, an application (e.g., an AE in an oneM2M context) registers with a M2M server (e.g., a CSE in an oneM2M context). The application is the registree entity, and the server is the registrar entity.

The term "SL entity" generally refers to an M2M/IoT Server, M2M/IoT Gateway or M2M/IoT Device in the M2M/IoT Area Network or the M2M/IoT Application Layer or M2M/IoT Service Layer software components.

The term "SL resource" generally refers to a uniquely addressable virtual entity in M2M/IoT SL.

The term "procedure" generally refers to methods of performing operations to achieve particular ends. The term "procedure" is used in place of "method" to avoid confusion with special meanings of the term "method" in the context of M2M and IoT applications. The steps described for procedures are often optional, and may potentially be performed in a variety of ways and a variety of sequences. Hence, herein the term "procedure" should not be interpreted as referring to a rigid set and sequence of steps, but rather to a general methodology for achieving results that may be adapted in a variety of ways.

Herein, the term "service capabilities requirement" and "service capabilities preference" generally refer to a requirement or preference of an entity for an amount of capability to be dedicated to serving a need of the entity. Service capabilities requirements and preferences may be expressed in terms of memory or CPU power to be dedicated to a task, or a number or frequency of operations or transactions to be performed. A service capability may include a service level, i.e., a level of communications bandwidth or quality, and additionally or alternatively include an availability by a provider entity or system of entities to meet a demand for processing tasks, traffic, transactions, or perform other functions. The terms "preferences" and "requirements" are often used interchangeably herein, since the processing of the two are very similar. The "preferences" of an entity may include both aspects of service that the entity prefers, e.g., the processing of 1000 transactions in a 24-hour period and 2 MB of server storage, along with and minimum requirements, e.g., the processing of at least 200 transactions in a 24-hour period.

An M2M/IoT Service Layer (SL) is a technology specifically targeted towards providing value-added services for M2M/IoT devices and applications. Recently, several industry standard bodies, such as oneM2M, ETSI and OCF have been developing M2M/IoT SLs to address the challenges associated with the integration of M2M/IoT devices and applications into deployments with the Internet/Web, cellular, enterprise, and home network. See, e.g.: oneM2M-TS-0001, oneM2M Functional Architecture, V-3.3.0; ETSI TS 102 690 Machine-to-Machine communications (M2M/IoT)

Functional architecture, V2.0.13; and the OIC Core Specification, v1.1.1, by the Open Connectivity Foundation.

An M2M/IoT SL may provide applications and devices access to a collection of M2M/IoT oriented capabilities. A few examples include security, charging, data management, device management, discovery, provisioning, and connectivity management. These capabilities are made available to applications via APIs which make use of message formats, resource structures and resource representations supported by the M2M/IoT SL.

From a protocol stack perspective, SLs are typically situated above the application protocol layer and provide value added services to applications they support. Hence SLs are often categorized as 'middleware' services. A protocol stack supporting a service layer may, for example, include six layers: (1) application layer; (2) service layer (SL); (3) application protocols (such as HTTP, COAP, and MQTT); (4) transport protocols (such as TCP and UDP); (5) network protocols (such as IPv4/IPv6); and (6) access network protocols (such as, Ethernet, cellular, Wi-Fi).

Figure 2:
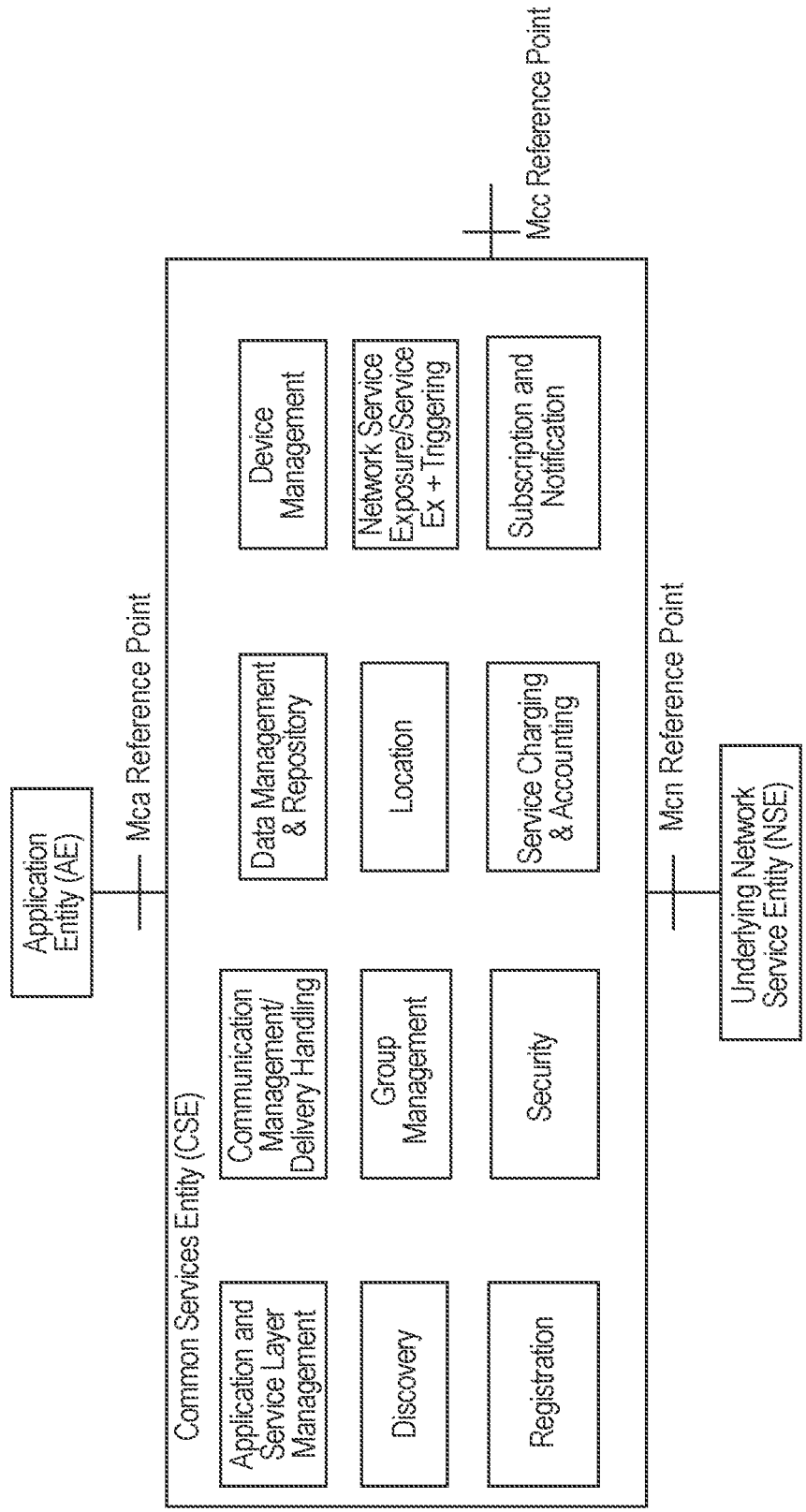
FIG. 2 is a block diagram illustrating oneM2M Common Service Functions.

The oneM2M TS-0001 standard defines an M2M/IoT SL. The purpose of the SL is to provide "horizontal" services that may be utilized by different "vertical" M2M/IoT systems and applications, such as e-Health, fleet management, and smart homes. The architecture of the oneM2M SL, as shown in FIG. 1, defines a Common Service Entity (CSE) that supports four reference points. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. A CSE contains multiple logical functions called "Common Service Functions (CSFs)", such as "Discovery", "Data Management & Repository." FIG. 2 illustrates the CSFs supported by oneM2M.

The oneM2M architecture is a distributed architecture and supports deploying M2M/IoT services in a distributed manner across several types of nodes, such as: Application Service Node (ASN); Application Dedicated Node (ADN); Middle Node (MN); Infrastructure Node (IN); and Non-oneM2M Node (NoDN). An ASN is a Node that contains one CSE and contains at least one Application Entity (AE). An example physical mapping is an ASN residing in an M2M/IoT device. An ADN is a Node that contains at least one AE and does not contain a CSE. An example physical mapping is an application dedicated node residing in a constrained M2M/IoT device. An MN is a node that contains a CSE. An MN may additionally contains one or more AEs. An example physical mapping is an MN residing in an M2M/IoT gateway. An IN is a node that contains a CSE. An IN may additionally contains one or more AEs. A CSE in an IN may contain CSE functions not applicable to other node types. An example physical mapping is an IN residing in an M2M/IoT service infrastructure. A non-oneM2M node is a node that does not contain oneM2M entities (e.g., neither AEs nor CSEs). Such nodes may be devices attached to the oneM2M system for interworking purposes, including management, for example.

Figure 3:
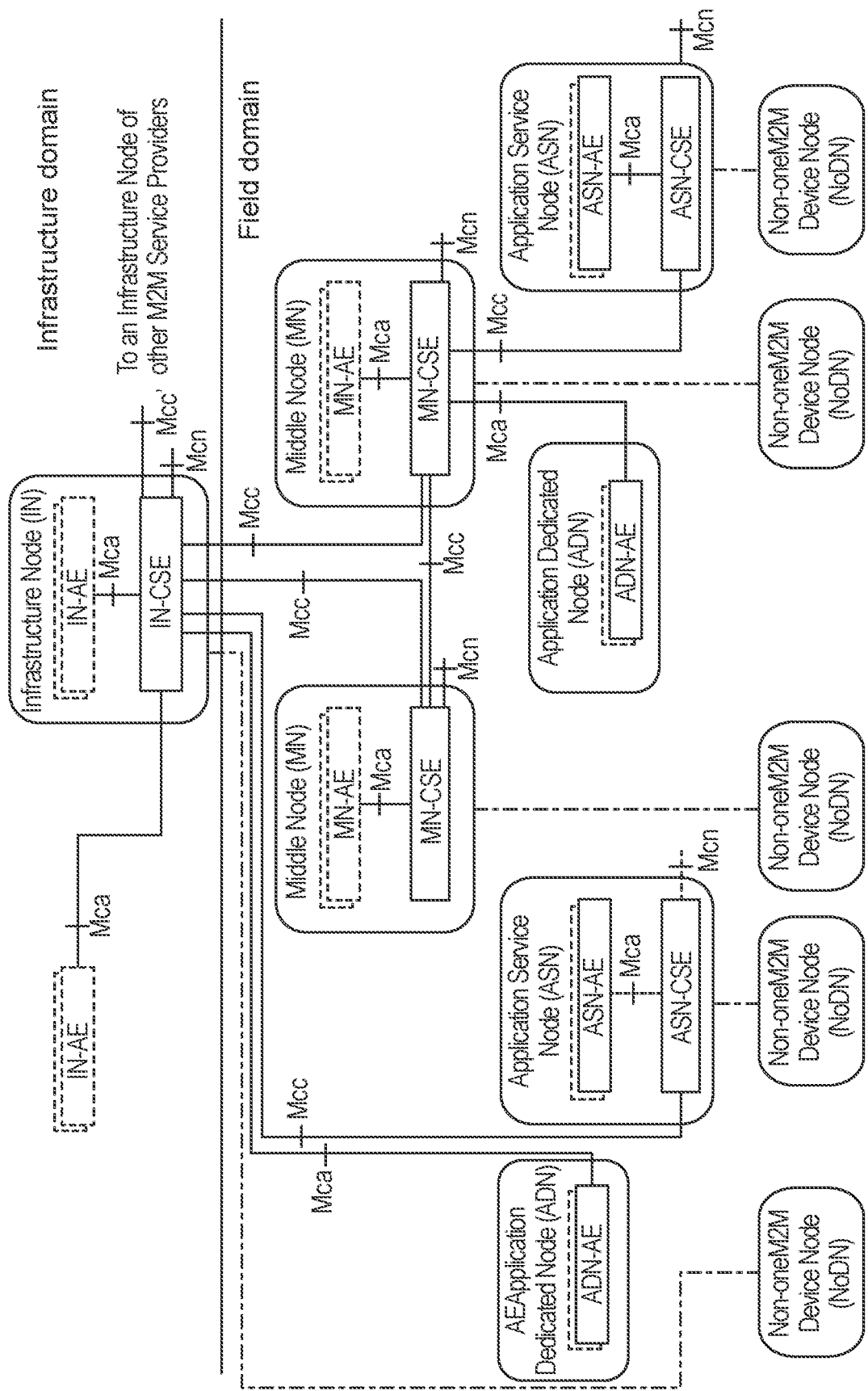
FIG. 3 is a block diagram illustrating example configurations supported by a oneM2M architecture.

FIG. 3 illustrates some example configurations of interconnecting the various entities supported within a oneM2M system.

Figure 4:
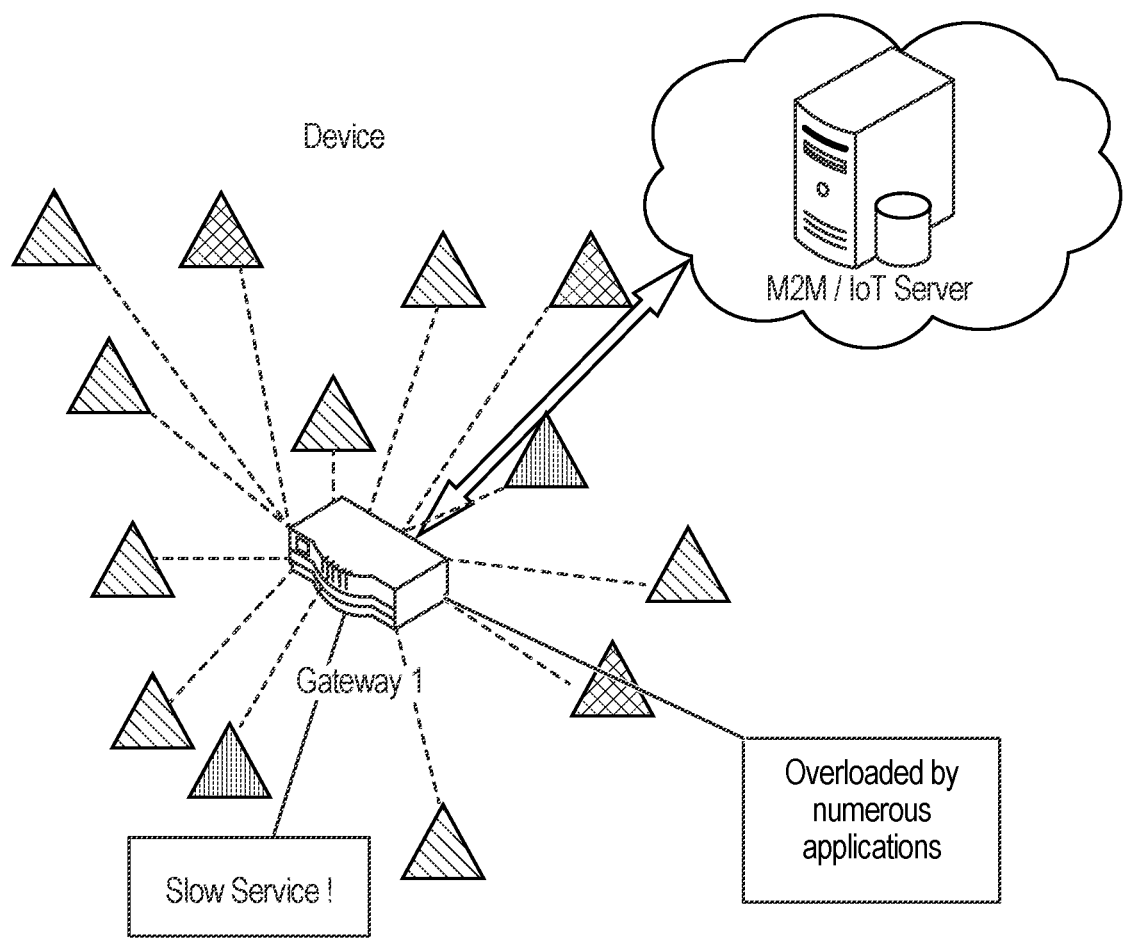
FIG. 4 is a block diagram illustrating an example of a service overload degrading the performance of M2M/IoT system.
Figure 5:
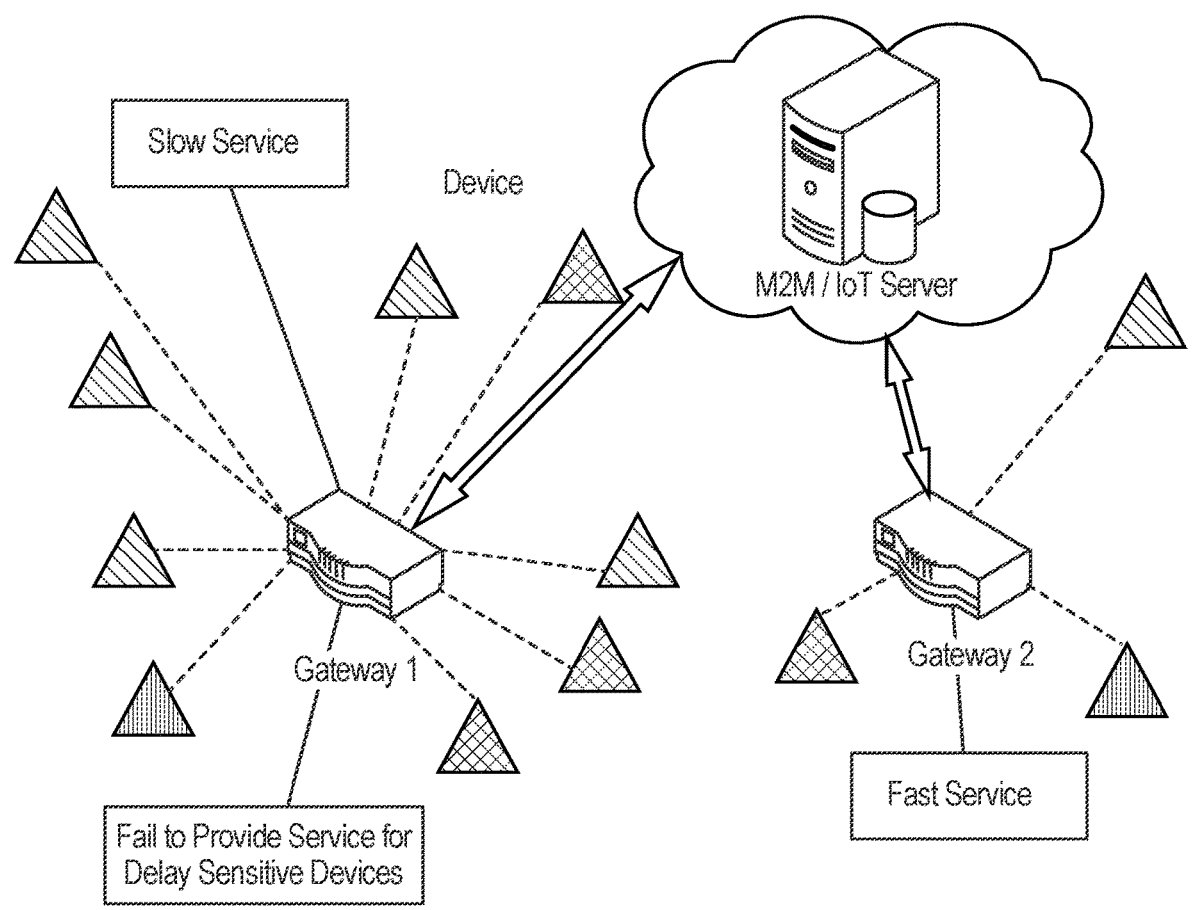
FIG. 5 is a block diagram illustrating an example of devices failing to register to a service layer (SL) when another SL entity may fulfill the level of support required by the device.

FIG. 4 and FIG. 5 illustrate use cases of an M2M/IoT network deployed by a service provider for a smart city. In networks of this kind, SL gateways, e.g., MN-CSEs in oneM2M, are usually deployed locally or at the edge of a network to provide low latency service. An SL gateway that is deployed usually has limited service capacities. A device registers to an SL gateway to provide and/or use one or more services available on the SL gateway. After the initial deployment, the service load at the SL gateway may change dynamically. Specifically, the number of devices that register to the SL gateway and use the services provided by the Gateway may change dynamically over time. For example, more devices register and use the services during the daytime and fewer devices register and use the services at night. In another example, more devices register and use the services during a social event.

At least two problems are commonly seen in the scenarios illustrated in FIGS. 4 and 5. The first problem is that a gateway that is deployed usually has limited service capacities. A lower layer protocol, e.g., a Zigbee protocol, may support 15 million "logical" devices in a local network. However, an SL gateway that has limited service capacities may have difficulty in providing service for 15 million devices. Current service layer technologies do not support the capability to allow devices (or their owners) to specify their level of service requirements to a service provider's platform. As a result, service provider's platform do not know in advance the number of requests that a device may issue to the platform in a time period. As a result, the service provider's platform cannot take proactive measures to reserve capacity on the platform or a particular node of the platform (e.g., a gateway or server) to fulfil the service required by the device. Moreover, this also results in the service provider's platform or certain nodes in the platform becoming overloaded and, in turn, the devices not receiving the level of support they require, as shown in FIG. 4.

The second problem is that when there is more than one SL gateway in the system, as shown in the example FIG. 5, a new device usually tries to register to an SL entity, e.g., Gateway 1, which is in the same local network. However, Gateway 1 may not meet the level of support required by the device due to the limited service capacities. For example, the device may require that a response be received within a certain time period after sending a request, which may exceed the service capacity provided by Gateway 1. Therefore, the device fails to register to SL even though there is another SL entity, e.g., Gateway 2, which could fulfill the level of support required by the device.

To address these and other problems, SL registrations may be enhanced such that SL gateways not only provide the required level of support for registered devices, but also determine whether to allow new devices to register based on whether adequate level of support exists for these new devices. A registrar entity may obtain the service capabilities requirements or preferences of a new registree entity, and only accept the registration if it has available service capacities that meet the service preferences or requirements of the new registree entity while continuing to fulfill the service preferences or requirements of existing registree entities.

In the scenario that there are multiple SL gateways, an enhanced distributed registration procedure may be used, for example, whereby a registree entity is allowed to register to one of the SL gateways that not only fulfils its service preferences or requirements, but also meets its service preference. After the registration, the service capabilities preferences or requirements associated with a registree entity may be update either by the registree entity or another party.

An enhanced SL registration procedure may include a registrar entity obtaining a service capabilities requirement of a new registree entity from a Service Capabilities Requirements Profile (SCRP), whereby the registrar entity only accepts the registration if it has adequate services capacity that meets the service capabilities requirement of the registree entity while still fulfilling the service capabilities requirement of existing registree entities. The SCRP contains a list of service preferences or requirements organized based on each individual service required by the Registree or its owner. For example, for each required service, a service ID, name, may be included.

Generic service preferences or requirements may include, for example: service request rate requirements; service data storage requirements; service response delay requirements; service availabilities; and affordable price.

A service request rate requirement may be used, for example, to specify the minimum and/or maximum number of requests the SL registree entity may generate or would like to receive per second. Moreover, different types of requests may have different service rate requirement. For example, the SL registree entity may request to create a resource every minute. In another example the SL registree entity may request to retrieve a resource every second. In another example the SL registree entity may request to receive a request from other SL entities every second.

A service data storage requirement may be used, for example, to specify the minimum and/or maximum number of bytes required by the SL registree entity to be stored by the SL registrar.

A service response delay requirement may be used, for example, to specify a maximum delay the SL registree entity may tolerate when requesting to use a service. For example, this delay may be expressed in seconds. Moreover, different types of requests may have different service response delay requirement. For example, the response delay requirement to retrieve a resource may be smaller than the delay to create a resource.

A service availability requirement may be used, for example, to specify a maximum service down period the SL registree entity may accept. For example, the service must be available for 99.5% of the requests that the SL registree entity makes to the SL registrar Entity.

An affordable price requirement may be used, for example, to specify a budget that the registree entity is willing to pay for a service. For example, the cost to access services offered by the SL registrar entity may not be allowed to exceed this cost.

Service specific requirements may include, for example, items such as: access window; service subscriptions requirement; notification requirement; and device triggerring requirement.

An access window value may be used to specify a time window in which the SL registree entity accesses SL resources, e.g., early morning (6 am-9 am), morning (9 am-12 pm), afternoon (12 pm-4 pm), evening (4 pm-7 pm), prime time (7 pm-11 pm), off hours (11 pm-6 am), etc.

A service subscriptions requirement may be used, for example, to specify a minimum and/or maximum number of entities that may subscribe to monitor certain events at the SL registree entity.

A notification requirement, for example, may be used to specify a minimum and/or maximum number of notifications that may be received by the SL registree entity per second.

A device triggerring requirement, for example, may be used to specify a minimum and/or maximum number of triggering messages than may be received by the SL registree entity per second.

In one example, a sensor device may generate 10 bytes of sensing data per minute, and require that the Gateway stores the sensing data for at least to one month. Therefore, the Gateway should have at least 500 KB data storage available in order to fulfill the service preferences or requirements for this category of device, e.g., Category 1 Sensor. In another example, a low quality video camera may generate 100 KB of streaming data per second, and required the Gateway to store video data up to 7 days. Therefore, the Gateway should have at least 58 GB of storage in order to fulfill the service requirements for this category of devices, e.g., a Category 2 Camera. In another example, a high quality video camera may generate 1 MB of streaming data per second, and require the Gateway to store video data up to 3 days. Therefore, the Gateway should have at least 254 GB of storage in order to fulfill the service requirements for this category of devices, e.g., Category 3 Camera. The SCRP may be predefined for different types and categories of devices, or may be defined when a Device enrolls or subscribes to the Service Provider which is out of scope for this disclosure.

A registrar entity, such as a gateway, may maintain a record of the amount of system resources consumed by existing service registrees and the remaining system resources available. For example, a registrar entity may estimate the amount of data storage that is reserved for existing service registrees, and the data storage that may be reserved for new registrees. Similarly, a registrar entity may estimate the maximum rate of service requests it may process per minute and a measure of the current service requests it receives per minute.

The registrar entity may use a variety of fields to store information regarding system resources consumed by existing service registrees. For example, System Capacity field may be used to indicate system resources allocated to the SL. This is the maximum system resources that may be used to provide service to registree entities. For example, memory, storage and CPU. A Residual System Capacity field may be used to indicate system resources that may be allocated to a new registree entity. For example, memory, storage and CPU. A System Capacity Utilization field may be used to indicate system resources utilized to provide service for existing SL registree entities. For example, memory, storage and CPU. A Service Request Rate field may be used to indicate the current service request rate of the registrar entity. In one example, number of requests it receives per second.

Similarly, a Service Request Rate Limit field may be used to indicate the maximum service request rate that the registrar entity may handle. For example, maximum number of requests it may receive per second. An Outgoing Rate of Notifications field may be used to indicate the current outgoing service notification rate of the registrar entity. A Outgoing Rate of Notifications Limit field may be used to indicate the maximum outgoing service notification rate that the registrar entity may handle.

A Service Processing Time field may be used to indicate the average time between the registrar entity receives a service request and sends a response to the request. In one example, the registrar entity may indicate the average service processing time in seconds. A Service Processing Time Limit field may be used to indicate the minimum time between the registrar entity receives a service request and sends a response to the request. In one example, the registrar entity may indicate the minimum service processing time in seconds.

Further, a Maximum Number of SL Registree field may be used to indicate the maximum number of SL Registree that a Registrar may support. The value depends on the type and category of Registree. For example, the Registrar may provide service for 10 Category 1 Camera devices, but may only provide service for 5 Category 2 Camera devices. A Number of SL Registree field may be used to indicate the number of SL Registrees that a Registrar currently has. For example, the Registrar currently provides service for 5 Category 1 Camera Devices and 1. Category 2 Camera Devices.

Of course, the service capacity information maintained by the registrar entity is not limited to these example fields.

Figure 6:
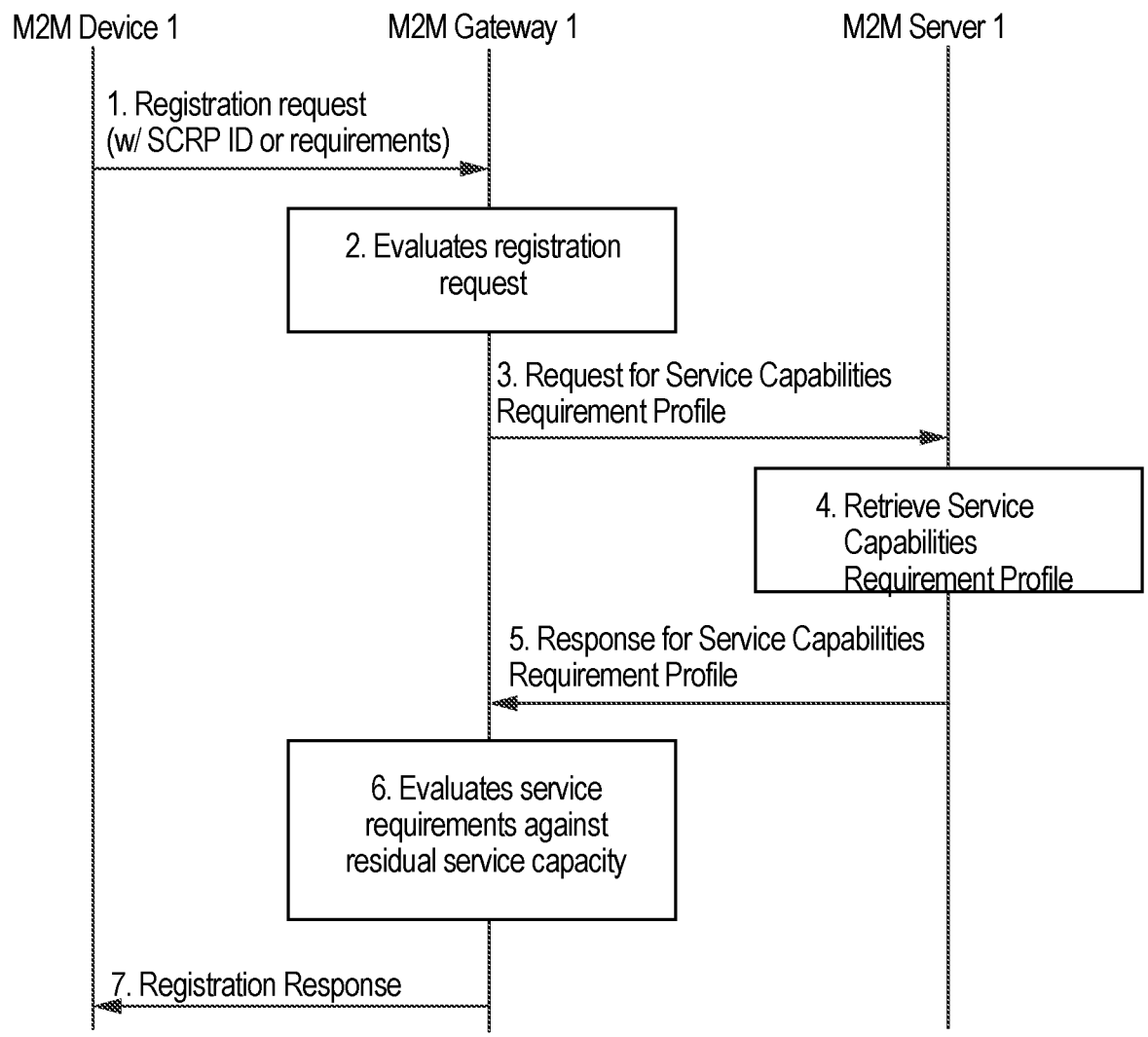
FIG. 6 shows a call flow of an example method for enhanced service layer registration to guarantee the service capabilities requirement of existing registree entities.

FIG. 6 is a call flow diagram of an example procedure that may be used, e.g., by the devices depicted in the example FIG. 4. As discussed above, FIG. 4 is a block diagram illustrating an example of a service overload degrading the performance of M2M/IoT system. FIG. 4 includes SL registrar Entities (Gateways and Server) and an SL registree entity (Device) In FIG. 4, Gateway 1 has registered to M2M/IoT Server 1. In FIG. 6, a new Device 1 registers to Gateway 1.

In step 1 of FIG. 6, the registree entity, Device 1, sends a registration request message to the registrar entity, Gateway 1. The registration request message may contain a SCRP Identifier and/or any of the service preferences or requirements as listed in the SCRP. In one example, the Device 1 may indicate it is a Category 1 camera and/or require the Gateway to have at least 58 GB data storage. In another example, the Device 1 may indicate it generates 100 KB streaming data every second and the data is required to be stored for at least 7 days.

A variety of service preferences or requirements may be included in a registration request message. For example, a service capabilities requirement profile identifier may be used to indicate the service capabilities requirement profile identifier, for example, to indicate that a registree entity is a "category 1 camera." Similarly, another service capabilities requirement may be used to indicate any of the service preferences or requirements as listed in the SCRP.

In step 2, after receiving the registration request message, Gateway 1 evaluates the registration request. If service preferences or requirements are not contained in the request or Gateway 1 does not know the specific requirements of the SCRP, Gateway 1 may indicate a request to retrieve the requirement SCRP associated with the Device 1 from the M2M/IoT Server 1 as shown in step 3. If Gateway 1 knows the service preferences or requirements, Gateway 1 may check its residual service capacity, e.g., by checking various fields in its record of system resources consumed by existing service registrees versus total system capacity, and decide whether it may provide service for the new devices and continue to meet the service capabilities requirement of existing registered devices. If so, Gateway 1 creates the registration for the Device 1 and reserves system capacity to fulfill the device's service requirements using information from the device's SCRP. In one example, if Device 1 is a category 1 sensor that generates 10 Bytes of sensing data every minute, and requires the Gateway to store sensing data for up to one month, the Gateway may check whether it has at least 500 KB of free storage available in order to provide service for this category of devices. After the registration is created, the free storage of Gateway 1 is reduced by 500 KB since the storage space is reserved to provide service for Device 1. In another example, the maximum number of requests Gateway 1 may process per minute is 1000, and the current request rate of Gateway 1 is 600 requests per minute. If Device 1 generates 500 requests per minute as specified in the registration request, Gateway 1 rejects the registration request from Device 1.

In step 3, Gateway 1 sends a request to M2M/IoT Server 1 to retrieve SCRP indicated in the registration request when service preferences or requirements are not contained in the request or Gateway 1 does not know the specific requirements of the SCRP.

In step 4, M2M/IoT Server 1 prepares to send a response to Gateway 1 including SCRP associate with Device 1. The SCRP may be obtained from the service profiles associated with Device 1.

In step 5, M2M/IoT Server 1 sends a response message to Gateway 1 including SCRP associated with Device 1.

In step 6, after receiving the response message, Gateway 1 processes the message and prepares to send a registration response message to Device 1. If SCRP is contained in the response, Gateway 1 may check its residual service capacity and decide whether it may provide service for the new devices and continue to meet the service capabilities requirement of existing registered devices as described in Step 2.

In step 7, Gateway 1 sends a registration response message to Device 1.

An SL registration procedure may be further enhanced to fulfill the service requirement and preference of new registree entities. For example, in such a procedure, SL Entities may obtain the service capabilities requirements and preference of a new registree entity from a SCRP or a Service Capabilities Preference Profile (SCPP), and select a registrar entity that not only fulfils the service preferences or requirements but meets the service preference of the registree entity. Similar with SCRP, the SCPP contains a list of service preference organized based on each individual Registree or its owner. For example, for each service preference, a service ID, name, or type, and a utility function and service preference criteria may be included. A utility function may be, for example, a weight function with service preference criteria as variable to measure the preference. A service preference criteria may be, for example: a service request rate preference; a service data storage preference; a service response delay preference; a service availability preference; a service price preference; or an access window preference.

The service preference may be a single criterion. For example, the registree entity prefers a registrar entity that has the most powerful CPU. In another example, the registree entity prefers a registrar entity that charges for a lower price. The service preference may also be a combination of multiple criteria. For example, a utility function contains multiple criteria and each criteria has a weight parameter associated with it.

Figure 7:
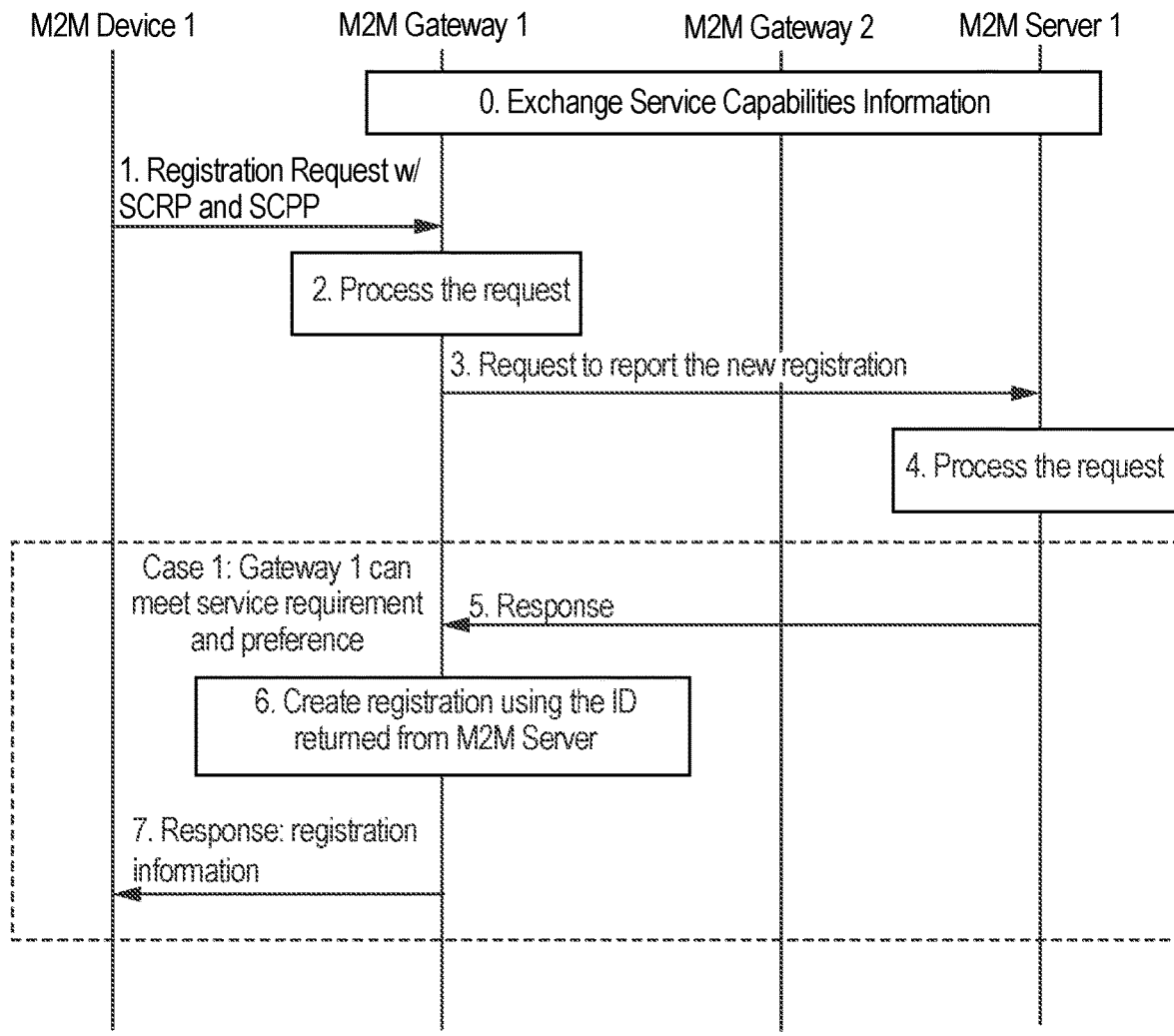
FIGS. 7 and 8 show a call flow of an example method for enhanced service layer registration to fulfill the service capabilities requirement of new registree entities.
Figure 8:
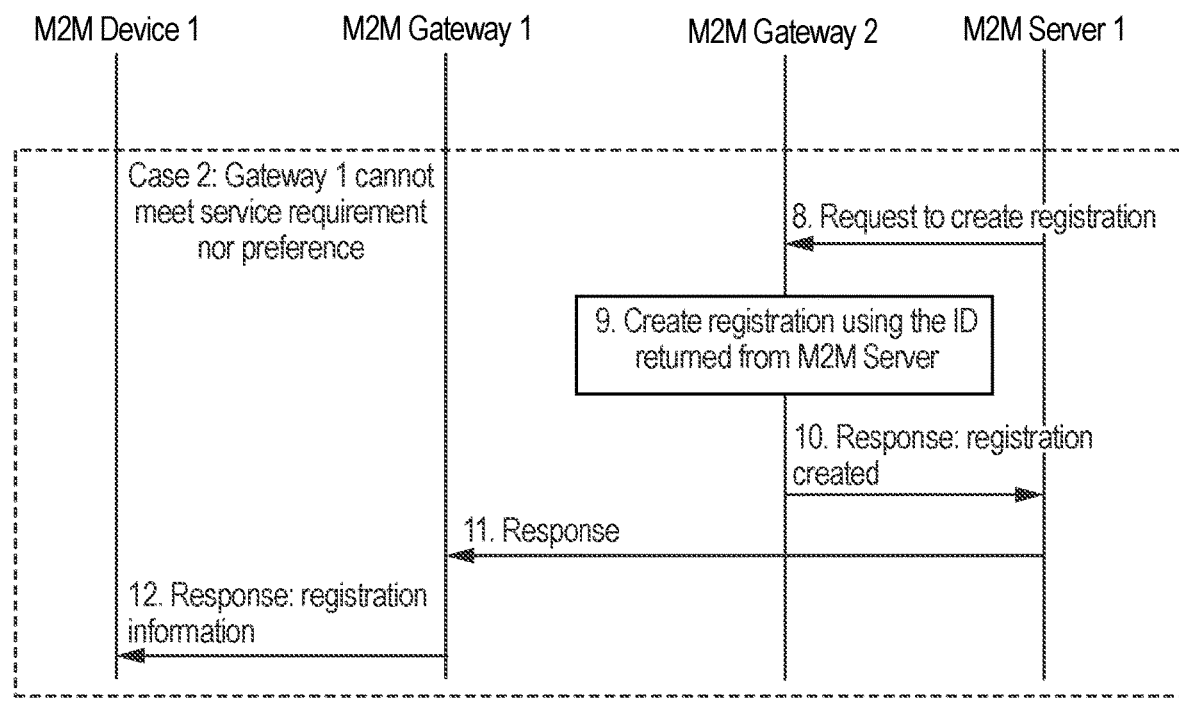

An example enhanced SL registration procedure is shown in FIG. 5, which includes SL entities (Gateways and Server) and an SL registree entity (Device). In FIG. 5, Gateway 1 and 2 have registered to the M2M/IoT Server 1; a new Device 1 registers to Gateway 1 using the proposed procedure as shown in FIG. 7 and FIG. 8.

In step 0 of FIG. 5, Gateway 1 and Gateway 2 exchange their service capacity information with M2M/IoT Server 1. In one example, Gateway 1 and Gateway 2 periodically report their service capacity information to M2M/IoT Server 1. In another example, M2M/IoT Server 1 may query service capacity information from Gateway 1 and Gateway 2 periodically or on demand.

In step 1, the registree entity, e.g., Device 1, sends a registration request message to the registrar entity, e.g., Gateway 1. The registration request message may contain the SCRP and/or service preferences or requirements.

The registration request message may also contain the SCPP and/or service preference information. For example, a service capabilities preference profile identifier may be used to indicate the service capabilities preference profile identifier, e.g., that the registree entity is a "category 2 camera." A service preference may be used to indicate any of the service capabilities preference in as listed in the SCPP.

In step 2, after receiving the registration request message, Gateway 1 processes the message and prepares to send a request to report this registration to M2M/IoT Server 1 including service capabilities requirements and service capabilities preference information in the registration request. For example, if service preferences or requirements are not contained in the request or Gateway 1 does not know the specify requirements of the SCRP, Gateway 1 indicates a request to retrieve the SCRP associated with Device 1 from the M2M/IoT Server 1. If service preferences or requirements are contained in the request, Gateway 1 may check its residual service capacity and decide whether it may provide service for the new device without failing to meet the service preferences or requirements of the existing registered devices. If service preferences are contained in the request, Gateway 1 may forward this information to the M2M/IoT Server as well.

In step 3, Gateway 1 sends the request to report this registration to the M2M/IoT Server 1.

A variety of fields may be included in a registration report request message. For example, a Registree Information Field may be used to indicate information regarding an SL registree entity, e.g., an IP address of "Device 1." A Registration Intention field may be used to indicate whether the registrar entity intends to provide Service for the registree entity. For example, the decision may be "Intend to Accept" if registrar entity may provide service for the new registree entity without failing to meet the service capabilities requirement of its existing registree entities or "Intend to Reject" otherwise. A Service Capabilities Requirement Profile Identifier field may be used to indicate the SCRP Identifier associated with the Registree. A Service Capabilities Requirement field may be used to indicate the Service Capabilities Requirement in the registration request. A Service Capabilities Preference Profile Identifier field may be used to indicate the SCPP Identifier associated with the Registree. A Service Capabilities Preference field may be used to indicate the Service Capabilities Preference in the registration request.

In step 4, M2M/IoT Server 1 processes the request, assigns an SL identifier to Device 1 and prepares to send a response to Gateway 1 including registree entity ID, Registrar Entity ID, and SCRP fields. After obtaining the service capabilities requirement and service preference either from the request or the service enrollment profile associated with Device 1, the M2M/IoT Server 1 selects an SL gateway that fulfills the service capabilities requirement and service preference based on the service capacity information obtained in Step 0. In one example, M2M/IoT Server 1 may first select all SL gateways that meet the service capabilities requirement associated with Device 1, then M2M/IoT Server 1 selects one Gateway as the SL registrar among them based on the service preferences associated with Device 1. For example, if the preference of the SL Register Entity is residual system capacity, M2M/IoT Server 1 selects the Gateway that has maximum residual system capacity. In the scenario that Gateway 1 is selected as the SL registrar, the M2M/IoT Server indicates Gateway 1's SL identification in the response message as shown in Step 5. In the scenario that another gateway, e.g., Gateway 2, is selected as the Registrar, M2M/IoT Server 1 sends a Delegate Registration Request message to Gateway 2 to create a registration for the registree entity. The Delegate Registration Request message contains information such as registree entity ID, Registree Information, and SCRP fields. For example, the M2M/IoT Server 1 contains the SCRP associated with the Device 1.

Registration management may then be achieved with SCRP and SCPP stored in an M2M/IoT server after the method of FIG. 7 is performed. For example, M2M/IoT Server 1 may contain a record where: a registree entity ID designates Device 1; a Registrar Entity ID designates Gateway 1; the SCRP is Category 1 Sensor; and the SCPP is also Category 1 Sensor.

In a registration report response message, a registree entity ID field may be used to indicate an SL ID of the registree entity, e.g., Device 1. A Registrar Entity ID field may be used to indicate an SL ID of the registrar entity to which the registree entity is registered. A service capabilities requirement profiles field may be used to indicate a service capabilities requirement profile associated with the registree entity.

In a delegate registration request message, a registree entity ID field may be used to indicate an SL ID of the registree entity, e.g., Device 1. A Registree Information field may be used to indicate registree Information, such as an IP address of Device 1. A Service Capabilities Requirement Profile field may be used to indicate a service capabilities requirement profile associated with the registree entity.

If Gateway 1 is selected as the SL registrar, steps 5 to 7 of FIG. 7 are executed. If Gateway 2 is selected as the SL registrar, steps 8 to 12 of FIG. 8 are executed.

In message 5 of FIG. 7, M2M/IoT Server 1 sends a response message to Gateway 1, e.g., including registree entity ID, Registrar Entity ID, and SCRP fields. Server 1 also stores the information that Device 1 registers to Gateway 1 and the SCRP and SCPP associated with Device 1.

In step 6, after receiving the response message, Gateway 1 creates a registration for Device 1 and stores the service capabilities requirement associated with Device 1.

In message 7, Gateway 1 sends the response to Device 1 including the SL Identification assigned by the M2M/IoT Server 1.

The call flow of FIG. 7 continues in FIG. 8, where a second case is shown. In message 8 of FIG. 8, M2M/IoT Server sends a delegate registration request message to Gateway 2 including fields in e.g., including registree entity ID, Registree Information, and SCRP fields.

In step 9, Gateway 2 creates a registration for Device 1 and stores the service capabilities requirement associated with Device 1.

In step 10, Gateway 2 sends a response to indicate the result of the registration. If Gateway 2 fails to create a registration, Server 1 selects another Gateway as in step 4 and sends a delegated registration to the selected Gateway.

In step 11, Server 1 sends the response to Gateway 1 including the SL Identification assigned by the M2M/IoT Server 1 and the SL Identification and/or Address (e.g., an IP address) of Gateway 2.

In step 12, Gateway 1 sends the response to Device 1 including the SL Identification assigned by M2M/IoT Server 1 and SL Identification and/or Address (e.g., an IP address) of Gateway 2. When Device 1 receives the response, it may directly communicate with Gateway 2 in the future.

Alternatively, Server 1 may skip step 9 and sends the response to Gateway 1 including the SL Identification assigned by the M2M/IoT Server 1 and the SL Identification and/or Address (e.g., an IP address) of Gateway 2. Then, Gateway 1 may send a delegate registration request message to Gateway 2, including registree entity ID, Registree Information, and SCRP fields, to create the registration on Gateway 2 on behalf of Device 1. In another alternative, Gateway 1 sends the response to Device 1 including the SL Identification assigned by M2M/IoT Server 1 and the SL Identification and/or Address (e.g., an IP address) of Gateway 2, then Device 1 may start a new registration creation process to create a registration on Gateway 2 by itself.

Enhanced SL registration management procedures may be used after the SCRP is updated either by the registree entity or another party. The procedure shown in FIG. 9 describes the scenario that the registree entity requests to update the SCRP. The procedure shown in FIG. 10 describes the scenario that the SCRP associated with registree entity is updated at the Server by another party, e.g., an SL enrollment update procedure may update the SL profile associated with registree entity. In order to describe the proposed procedure, SL entities (Gateways and Server) and application entity (Device) in FIG. 6 are used as an example. In FIG. 6, Gateway 1 and 2 have registered to M2M/IoT Server 1, and Gateway 1 is the registrar entity for Device 1 using the proposed procedure as shown in FIG. 7 and FIG. 8.

Figure 9:
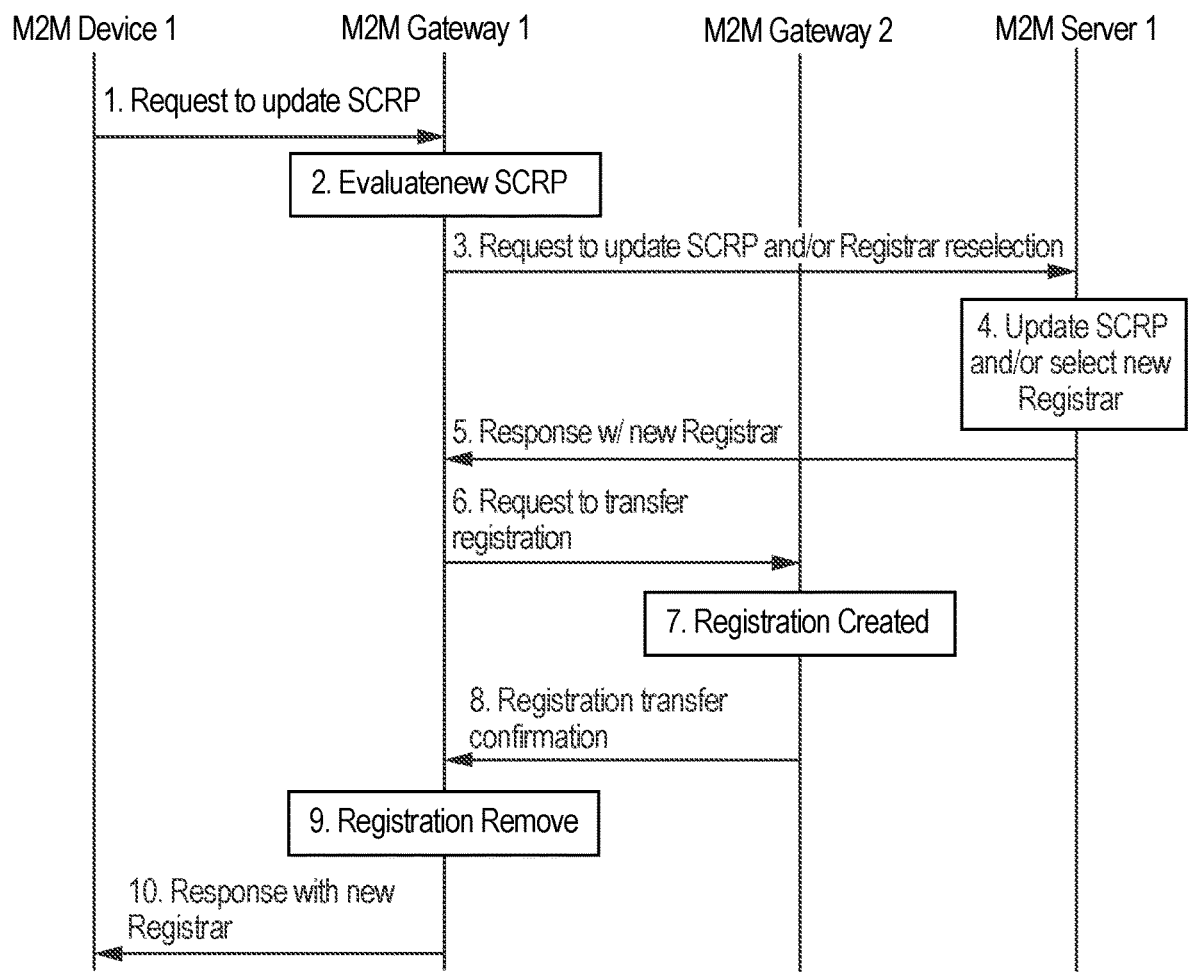
FIG. 9 shows a call flow of an example procedure for service layer registration management when a Service Capabilities Requirement Profile (SCRP) is updated by the registree.

FIG. 9 illustrates an example procedure for service layer registration management when an SCRP is updated by the registree. In the example of FIG. 9, the registree entity requests to update the SCRP 13 Procedure.

In step 1, the registree entity, e.g., a Device 1, sends a requests to update the SCRP or proposes new service preferences or requirements to the registrar entity, e.g., a Gateway 1. The request message may contain the new SCRP and/or service preferences or requirements.

In step 2, after receiving the SCRP update request message, Gateway 1 updates the SCRP associated with Device 1. Gateway 1 may check its residual service capacity and decide whether it may fulfil the updated service request for Device 1 without failing to meet the service preferences or requirements of existing registree entities. If so, Gateway 1 updates the service capacity reserved for Device 1 and sends a request to update the SCRP stored at the Server 1. Otherwise, Gateway 1 sends a request to Server 1 for reporting that it cannot fulfil the new requirements and request Server 1 to update the SCRP and select a new Gateway that may fulfil the new service preferences or requirements.

In step 3, Gateway 1 sends the request to report the updated SCRP to M2M/IoT Server 1.

In step 4, M2M/IoT Server 1 updates the SCRP associated with Device. If Gateway 1 requests to select a new Gateway, M2M/IoT Server 1 selects a new registrar entity that fulfills the new service capabilities requirement using the same method described in connection with Step 4 of FIG. 7.

In step 5, M2M/IoT Server 1 sends a response message to Gateway 1 including the information of the new Registrar, e.g., a Gateway 2. Optionally, Server 1 may sends a request message to Gateway 2 in order to notify that Gateway 2 is selected as the new Registrar.

In step 6, after receiving the response message, Gateway 1 sends a request to Gateway 2 to transfer the registration associated with Device 1. The detailed procedure for how to transfer the registration is out of the scope of this disclosure.

In step 7, Gateway 2 creates a registration for Device 1 and stores the service capabilities requirement associated with Device 1.

In step 8, Gateway 2 sends a response to indicate the result of the registration.

In step 9, Gateway 1 may remove the registration and release the reserved resources associated with Device 1 if the registration is transferred to Gateway 2 successfully. If Gateway 2 fails to create a registration, Gateway 1 requests Server 1 to select another Gateway as in step 3.

In step 10, Gateway 1 sends the response to Device 1. The response also includes SL Identification and/or Address (e.g., a IP address) of the new registrar entity, e.g., Gateway 2, if it is selected by the Server. When this happens, Device 1 may directly communicate with Gateway 2 in the future.

Figure 10:
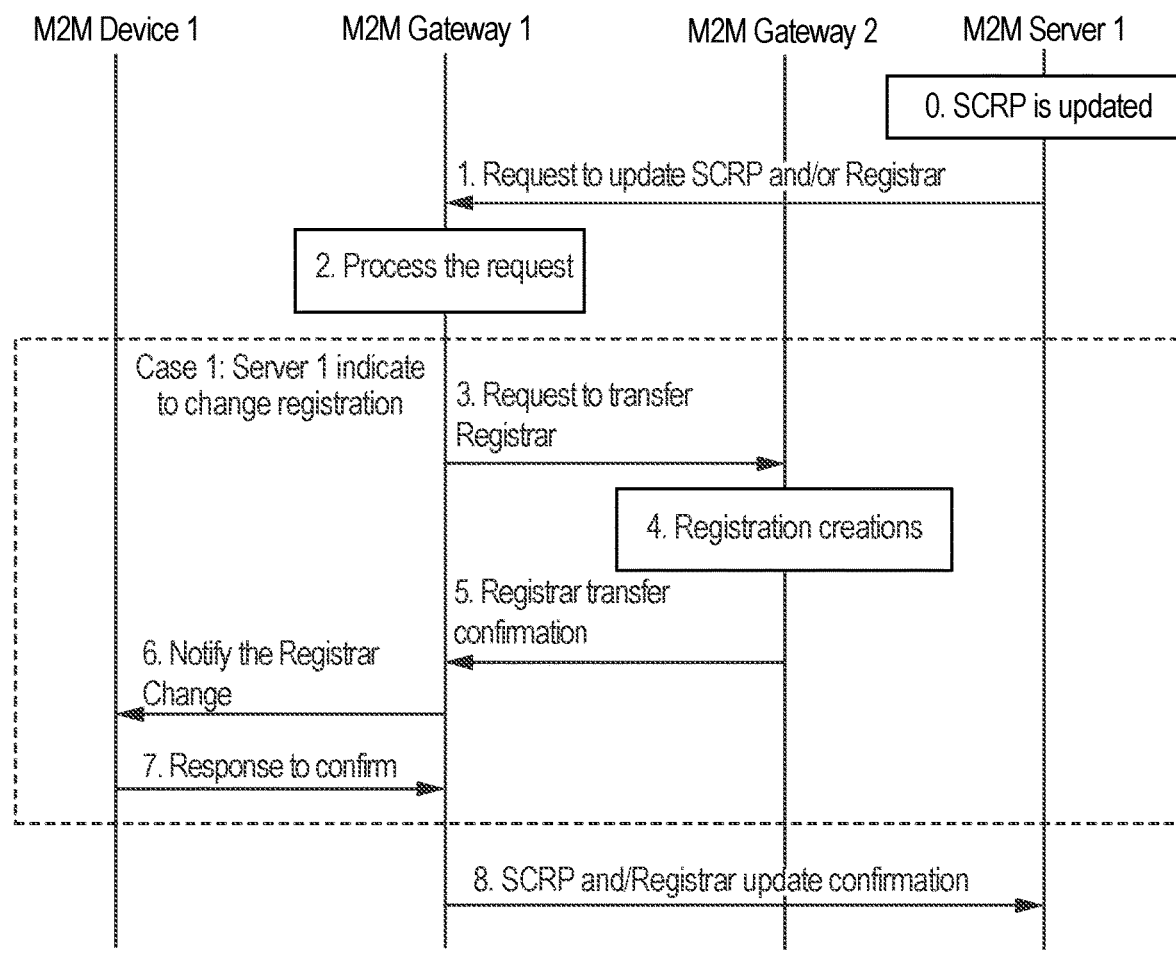
FIG. 10 shows a call flow of an example procedure for service layer registration management when SCRP is updated by a server.

FIG. 10 illustrates an example procedure for service layer registration management when SCRP is updated at the server. In the example of FIG. 10, the SCRP associated with registree entity is updated at the Server by another party, e.g., an SL enrollment update procedure may update the SL profile associated with registree entity.

In step 1, after the SCRP is updated, M2M/IoT Server 1 searches for all SL Entities that are associated with the SCRP, e.g., Device 1, and finds the Registrar Entities of Device 1, e.g., Gateway 1. Server 1 then checks the service capacity information of Gateway 1 and decides whether Gateway 1 may fulfil the updated service request for Device 1 without failing to meet the service capabilities requirement of existing registree entities of Gateway 1. If so, Sever 1 sends a request to Gateway 1 for updating SCRP stored at the Gateway 1. Otherwise, Sever 1 selects a registrar entity, e.g., Gateway 2, which fulfills the service capabilities requirement and service preference based on the service capacity information same as step 4 as shown in FIG. 7 and FIG. 8. Server 1 then sends a request to Gateway 1 for indicating that Gateway 1 cannot fulfil the new service preferences or requirements. Server 1 requests Gateway 1 to update the SCRP and transfer the registration to Gateway 2 that may fulfil the new service preferences or requirements.

In step 2, Gateway 1 updates the SCRP associated with Device 1. In case Gateway 1 is instructed to transfer the registration associated with Device 1 to Gateway 2, Step 3 to Step 7 are executed.

In step 3, after receiving the response message, Gateway 1 sends a request to Gateway 2 to transfer the registration associated with Device 1. The detailed procedure for how to transfer the registration is out of the scope of this disclosure.

In step 4, Gateway 2 creates a registration for Device 1 and stores the service capabilities requirement associated with Device 1.

In step 5, Gateway 2 sends a response to indicate the result of the registration.

In step 6, Gateway 1 may remove the registration and release the reserved resources associated with Device 1 if the registration is transferred to Gateway 2 successfully. If Gateway 2 fails to create a registration, Gateway 1 requests Server 1 to select another Gateway in the response message in Step 10. Gateway 1 then sends a notification to Device 1. The notification includes SL Identification and/or Address (e.g., an IP address) of the new registrar entity, e.g., Gateway 2

In step 7, Device 1 sends a response to confirm the registration transfer and may directly communicate with Gateway 2 in future.

In step 8, Gateway 1 sends a response to confirm the request about the SCRP update and registration transfer.

Figure 11:
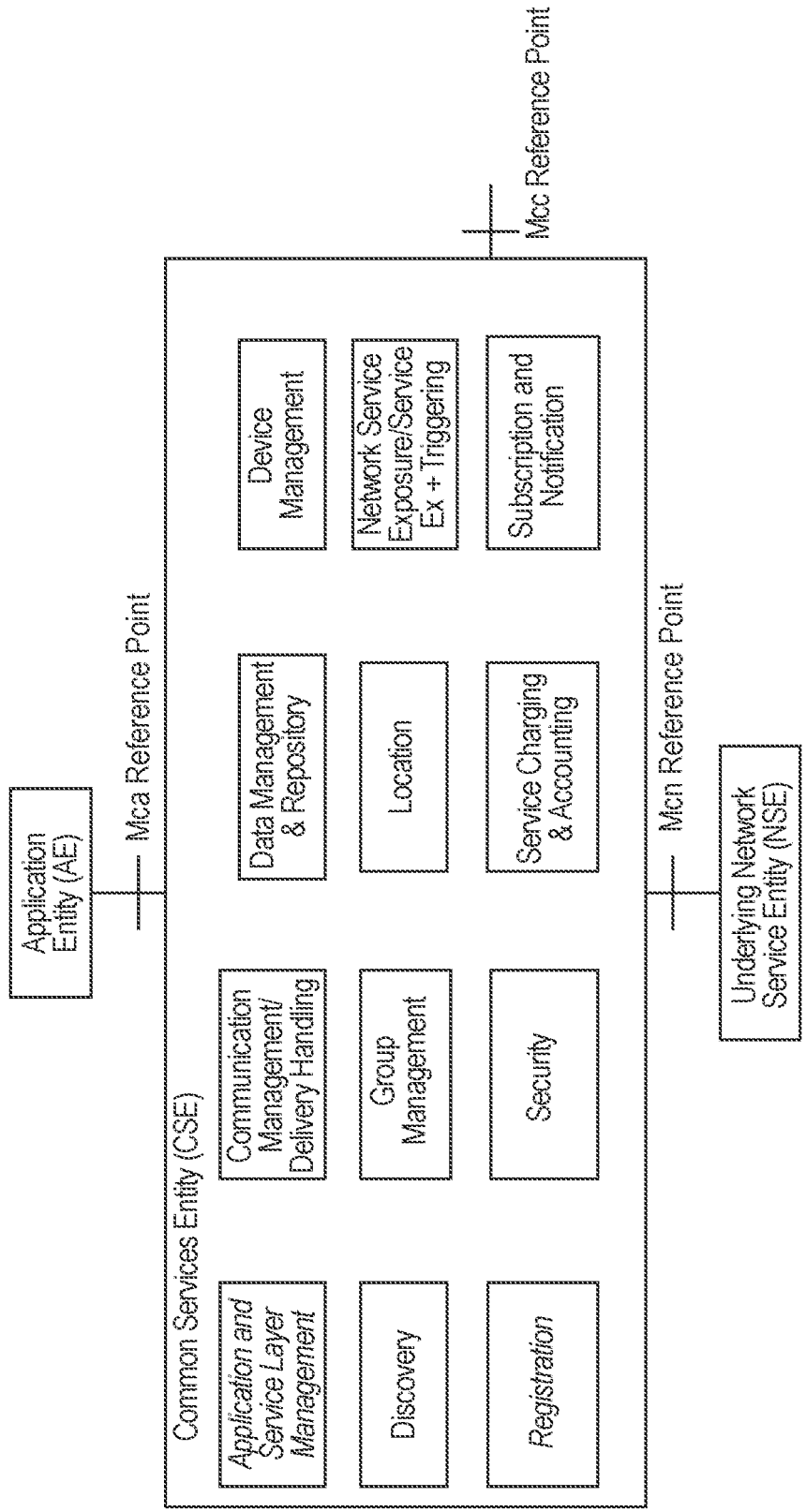
FIG. 11 is a block diagram illustrating oneM2M Common Service Functions.

OneM2M defines the capabilities supported by the oneM2M Service Layer. The oneM2M Service Layer is instantiated as a Capability Services Entity (CSE) which comprises a set of Capability Service Functions (CSF). For example, various methods proposed herein may be implemented as part of an enhanced Registration CSF and/or part of an Application and Service Layer Management CSF, such as those shown in FIG. 11. CSEs may communicate via the Mcc and Mcc' reference point to manage registration. An Application Entity (AE) may communicate via the Mca reference point to manage registration.

In order to support monitoring and managing SL registree entities, new service capacities, resources, and attributes are proposed herein. For example, such structures may be used in a oneM2M Resource Oriented Architecture.

New common attributes, e.g., serviceRequirement and servicePreference, are proposed for use in <AE>, <CSE-Base>, <remoteCSE> and <m2mServiceSubscription Profile >

A serviceRequirement attribute may contain a list of service preferences or requirements organized based on each individual service required by the Registree or its owner. For example, for each required service, the following information generic and specific service requirements could be included.

Generic service requirements may include, for example: a service request rate requirement; a service data storage requirement; a service response delay requirement; a service availability; or an affordable price requirement.

A service request rate requirement, for example, may specify a minimum and/or maximum number of requests the SL registree entity may generate or would like to receive per second. Moreover, different types of requests may have different service rate requirements. For example, the SL registree entity may request to create a resource every minute. In another example the SL registree entity may request to retrieve a resource every second. In another example the SL registree entity may request to receive a request from other SL entities every second.

A service data storage requirement, for example, may specify a minimum and/or maximum number of bytes required by the SL registree entity to be stored by the SL registrar. This field may be optional.

A service response delay requirement, for example, may specify a maximum delay the SL registree entity may tolerate when requesting to use a service. For example this delay may be expressed in seconds. Moreover, different types of requests may have different service response delay requirements. For example, the response delay requirement to retrieve a resource may be smaller than the delay to create a resource.

A service availability requirement, for example, may specify a maximum service down period the SL registree entity may accept. For example, the service must be available for 99.5% of the requests that the SL registree entity makes to the SL registrar Entity.

Affordable price requirement. In one example, this value specifies the budget the registree entity is willing to pay the service. For example, the cost to access services offered by the SL registrar Entity cannot exceed this cost.

Specific service requirements may include, for example: an access window; a service subscriptions requirement; a notification requirement; or a device triggers requirement.

An access window requirement, for example, may specify a time window the SL registree entity accesses SL resources (for example, early morning (6 am-9 am), morning (9 am-12 pm), afternoon (12 p-4p), evening (4p-7p), primetime (7p-11p), off hours (11p-6a), etc.)

A service subscriptions requirement, for example, may specify a minimum and/or maximum number of entities that may subscribe to monitor certain events at the SL registree entity.

A notification requirement, for example, may specify a minimum and/or maximum number of notifications that may be received by the SL registree entity per second.

A device triggers requirement, for example, may specify a minimum and/or maximum number of triggering messages that may be received by the SL registree entity per second.

The servicePreference attribute may contain a list of service capabilities preferences organized based on each individual service required by the Registree or its owner. For example, for each required service, the servicePreference attribute may contain a service ID, name, or type, along with service preference criteria such as: a service request rate preference; service data storage preference; service response delay preference; service availability preference; service price preference; and access window preference.

A new resource, e.g., <serviceCapacity> may be used for <CSEBase> and <remoteCSE> to store the service capacity information associate with a CSE. The <serviceCapacity> resource may have a number of attributes. A systemCapacity attribute may be use to indicate system resources allocated to the SL. This is the maximum system resources that may be used to provide service to the CSE, such as, memory, storage and CPU. A residualCapacity attribute may be use to indicate system resources that may be allocated to new devices that are not already accounted for by existing registered devices, such as memory, storage and CPU.

A system Utilization attribute may be used to indicate system resources utilized to provide service for existing registered devices, such as memory, storage and CPU.

A serviceRequest Rate attribute may be used to indicate the current service request rate of the CSE; for example, the number of requests it receives per second.

Further, a serviceRequestRateLimit attribute may be used to indicate the maximum service request rate that the CSE may handle, such as the maximum number of requests it may receive per second. An outgoingRateofNotifications attribute may be use to indicates the current outgoing service notification rate of the CSE. An outgoingRateofNotificationsLimit attribute may be used to indicates the maximum outgoing service notification rate that the CSE may handle. A serviceProcessingTime attribute may be use to contain indicates the average time between when the CSE receives a service request and sends a response to the request. In one example, the CSE may indicate the average service processing time in seconds.

Further still, a serviceProcessingTimeLimit attribute may be use to contain indicates the minimum time between when the CSE receives a service request and sends a response to the request. In one example, the CSE may indicate the minimum service processing time in seconds. A maximumNumberofSLRegistree attribute may be use to indicates the maximum number of devices that the CSE may support. The value depends on the type and category of Registrees. For example, the CSE may provide service for 10 Category 2 Camera devices, but may only provide service of 5 Category 3 Camera devices. A number of SLRegistree attribute may be use to indicates the number of devices that have registered to the CSE. For example, the CSE currently provides service for 5 Category 2 Camera devices and 1 Category 3 Camera devices.

Figure 12:
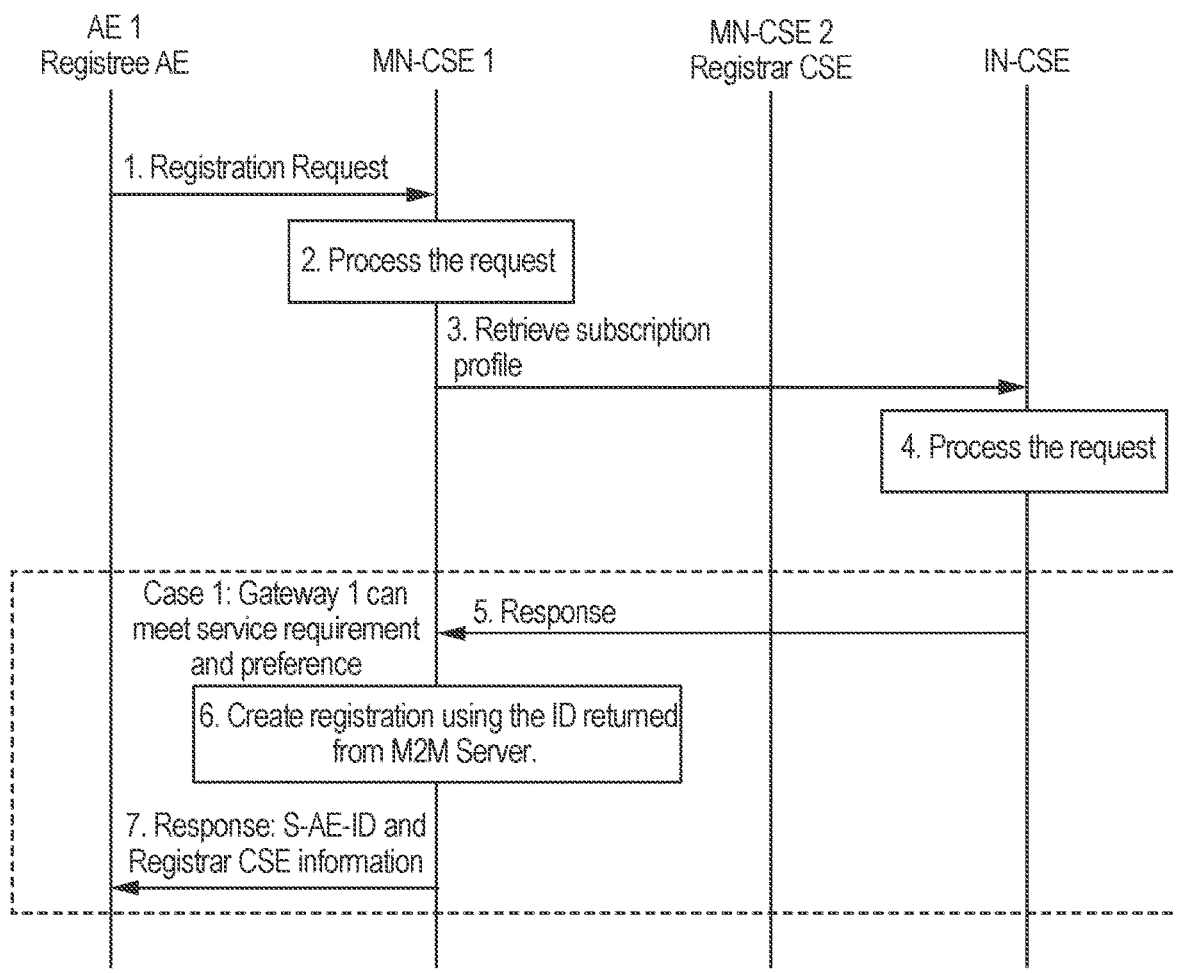
FIGS. 12 and 13 show a call flow of an example procedure for enhanced registration to fulfill service capability requirement
Figure 13:
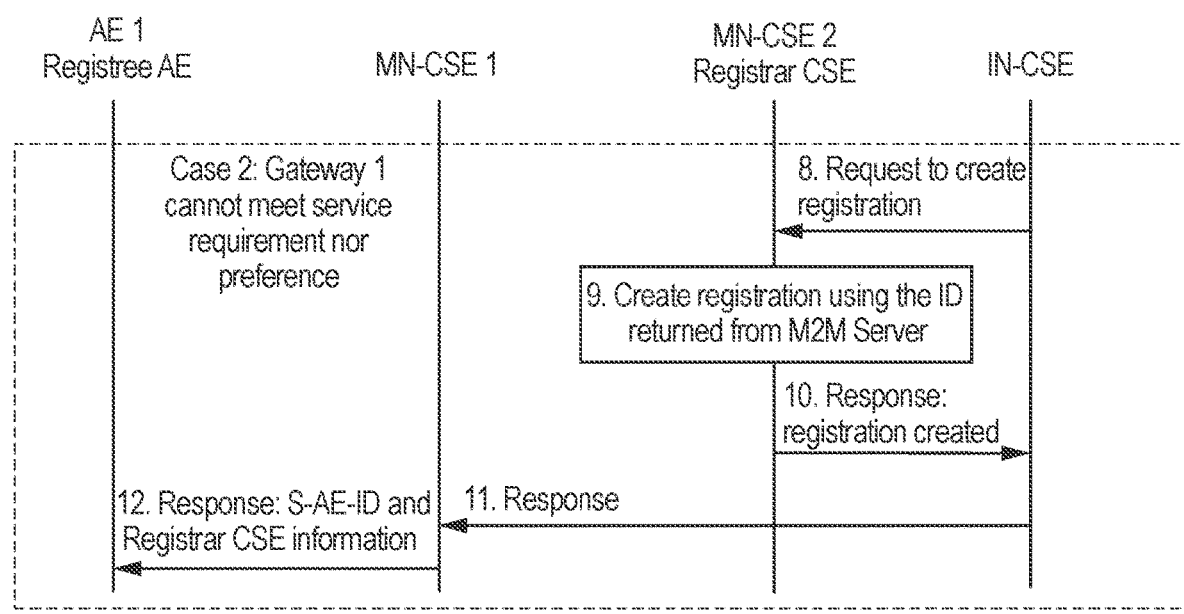

An example registration procedure to fulfill service requirements is shown in FIG. 12 and FIG. 13.

Referring to FIG. 12, in step 1, the Registree AE sends a registration request message to MN-CSE 1. The registration request message may contain the service requirements and preferences as attributes in the Content parameter as listed in 9. The registration request message may contain the service preference.

In step 2, after receiving the registration request message, MN-CSE 1 processes the message and prepares to send a request to report this registration to IN-CSE. For example, if service requirements are not contained in the request, MN-CSE 1 send a request to retrieve the service requirement profiles associated with the device from the <m2mServiceSubscriptionProfile > from IN-CSE. If service requirements are contained in the request, MN-CSE 1 may check its residual service capacity and decide whether it may provide service for the Registree AE without failing to meet the service requirement of existing registree entities. If service preference is contained in the request, MN-CSE 1 may send a request to IN-CSE which includes service preference attributes associated with the device.

In step 3, MN-CSE 1 sends the request to report this registration to M2M/IoT Server 1, which is prepared in step 2.

In step 4, IN-CSE processes the request, assigns an S-AE-ID to the Registree AE and prepares to send a response to MN-CSE 1 including the CSE-ID of the Registrar CSE as attributes in the Content parameter. After obtaining the service requirement and service preference either from the request or the <serviceSubscribedNode > associated with the Registree AE, IN-CSE selects a MN-CSE that fulfills the service requirement and service preference based on the <serviceCapacity> associated with the MN-CSE The detail algorithm for IN-CSE to select a Registrar CSE is out of scope of this disclosure. In one example, IN-CSE may first select all MN-CSEs that meet the service preferences or requirements associated with the Registree AE, then IN-CSE selects one CSE as the Registrar CSE based on the service preferences associated with the Registree AE. For example, if the preferences of the Registree AE is data processing capacity, IN-CSE selects the Gateway that has the maximum data processing capacity. In the scenario that MN-CSE 1 is selected as the Registrar CSE, IN-CSE indicates MN-CSE 1's CSE-ID in the response message as in Step 5. In the scenario that another CSE, e.g., MN-CSE 2, is selected as the Registrar CSE, the IN-CSE sends a delegate registration request to MN-CSE 2 to create a registration for the Registree AE as in step 8. The Delegate Registration Request message contains information such as registree entity ID, Registree Information, and SCRP fields as attributes in the Content parameter. For example, IN-CSE contains AE-ID, Point of Access (PoA) and the service requirement profile obtaining from service enrollment profiles associated with the Registree AE.

In case MN-CSE1 is selected as the IN-CSE, Step 5 to Step 7 are executed.

In step 5, IN-CSE sends a response message to MN-CSE 1 including registree entity ID, Registrar Entity ID, and SCRP fields.

In step 6, after receiving the response message, MN-CSE 1 creates a registration for AE 1 and stores the service requirement associated with AE 1. Specifically, MN-CSE 1 creates an <AE> resource, using the AE-ID and service requirements provided in the Content parameter in the response message.

In step 7, MN-CSE 1 sends the response to AE 1 including the S-AE-ID assigned by IN-CSE.

In case MN-CSE2 is selected as the IN-CSE, Step 8 to Step 12 are executed.

The procedure of FIG. 12 continues in FIG. 13. Referring to FIG. 13, in step 8, IN-CSE sends a delegate registration request message (through a NOTIFY request) to MN-CSE 2 including registree entity ID, Registree Information, and SCRP fields. Specifically, the request contains the AE-ID, PoA and service requirements associated with the AE as attributes in the Content parameter.

In step 9, MN-CSE 2 creates a registration for AE 1 and stores the service requirement associated with AE 1. Specifically, MN-CSE 2 creates an <AE> resource, using the AE-ID, PoA and service requirements provided in the delegate registration request message.

In step 10, MN-CSE 2 sends a response to indicate the result of the registration creation. If MN-CSE 2 fails to create a registration, IN-CSE selects another Gateways as described in step 4 and sends a delegated registration to the selected CSE.

In step 11, IN-CSE sends the response to MN-CSE 1 including the S-AE-ID assigned by IN-CSE and CSE-ID and/or Address (e.g., an IP address) of the registrar entity, e.g., MN-CSE 2, as attributes in the Content parameter.

In step 12, MN-CSE 1 sends the response to AE 1 including the S-AE-ID assigned by IN-CSE and CSE-ID and/or Address (e.g., an IP address) of the registrar entity, e.g., MN-CSE 2, as attributes in the Content parameter. When AE 1 receives the response, it may directly communicate with MN-CSE 2 in future.

FIG. 14 shows an example user interface for use, e.g., on a M2M/IoT Server such as a oneM2M IN-CSE, to configure and/or display service requirement profile of AEs or CSEs. FIG. 15 shows an example of a user interface for displaying service capacity information of CSEs that registered in the service provider.

Figure 16:
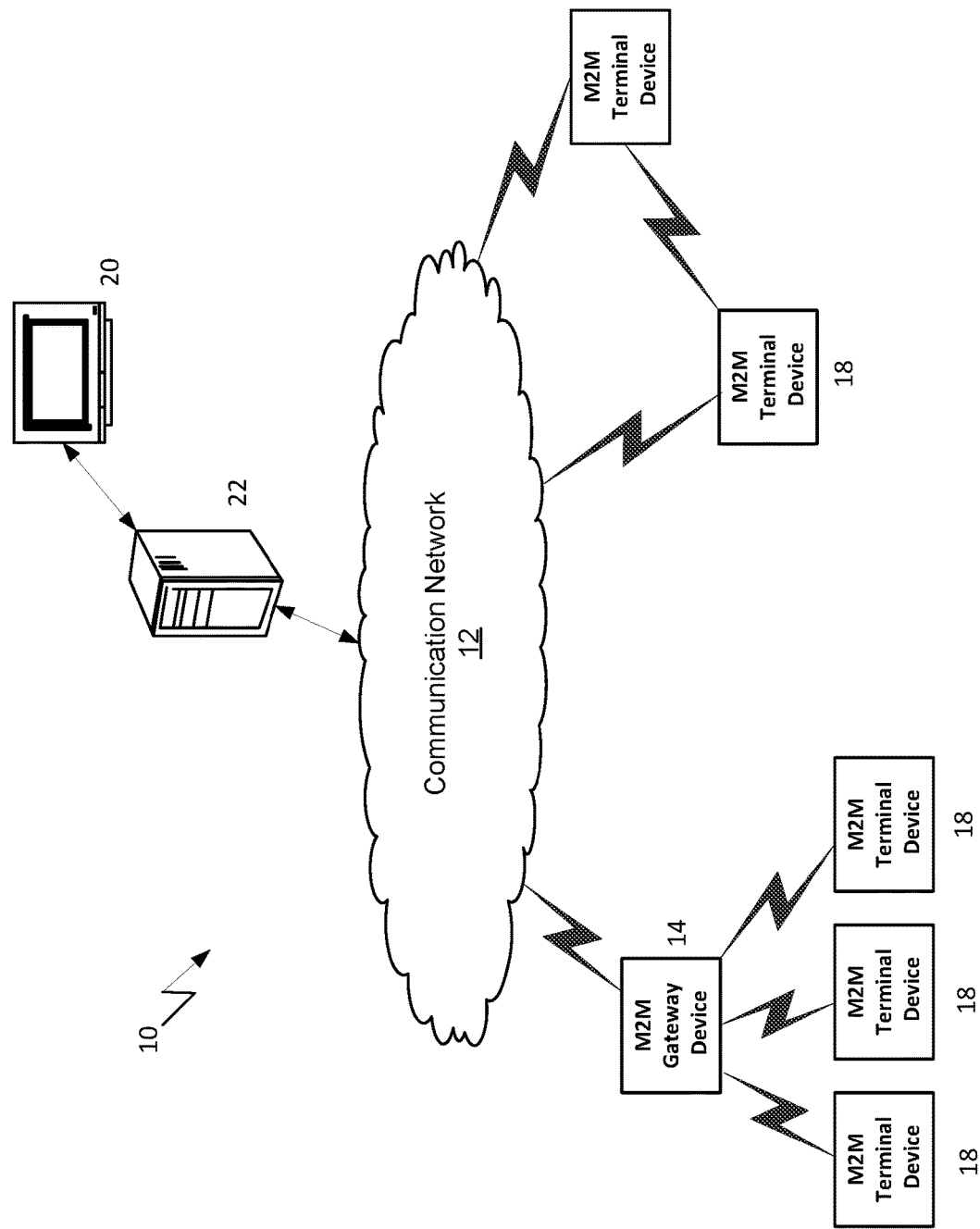
FIG. 16 is a system diagram of an example machine-to-machine (M2M), Internet of Things (IoT), or Web of Things (WoT) communication system in which one or more disclosed embodiments may be implemented.

FIG. 16 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 1, 3-10, 12, 13, and 16-19 may comprise a node of a communication system, such as the ones illustrated in FIGS. 1, 3-10, 12, 13, and 16-17.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 16, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 16, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 17:
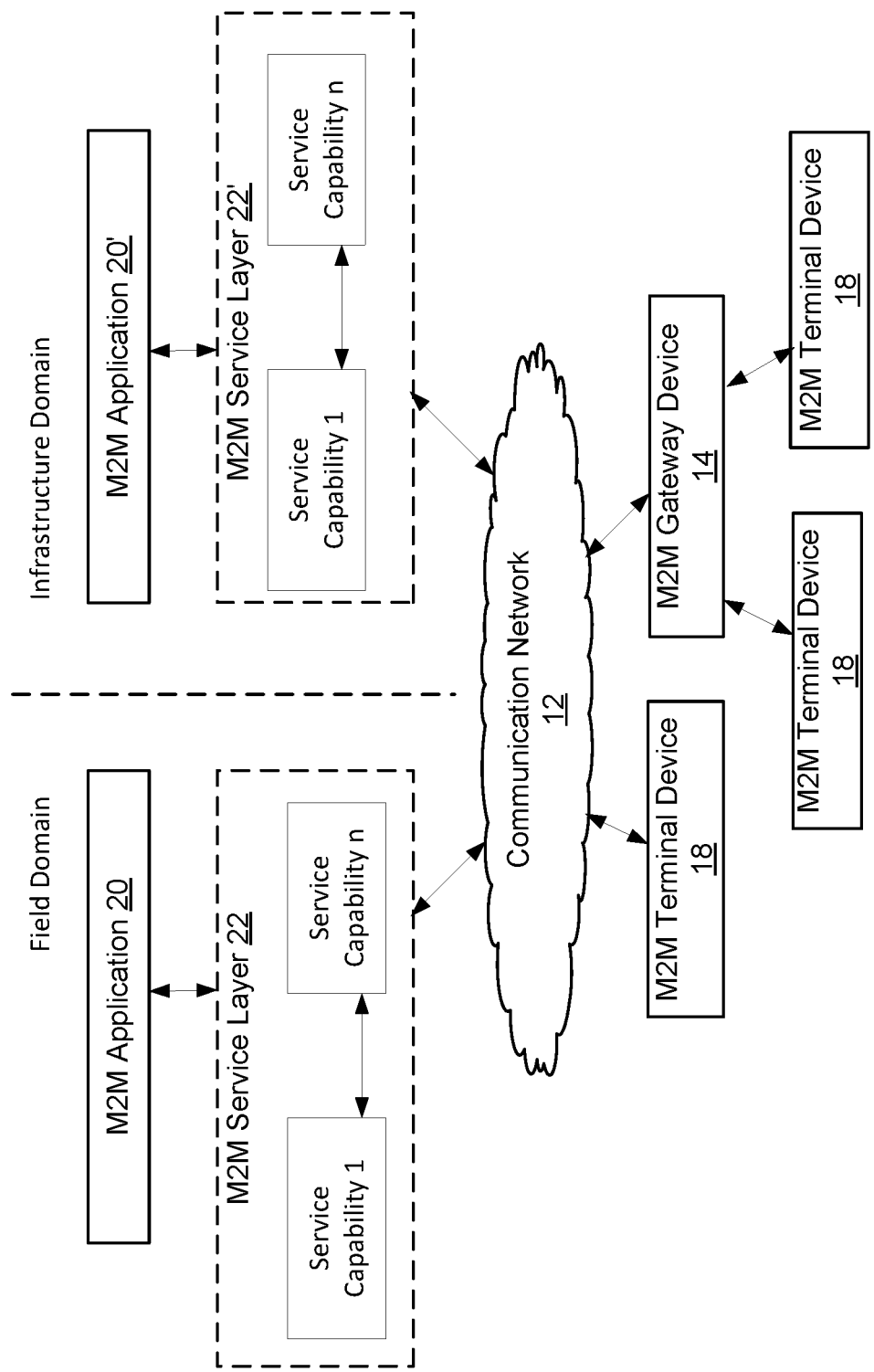
FIG. 17 is a system diagram of an example architecture that may be used within the M2M/IoT/WoT communications system illustrated in FIG. 16.

Referring to FIG. 17, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 17, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 17, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 18 or FIG. 19 described below.

Further, the methods and functionalities described herein may be implemented as part of an M2M network that uses a Service Oriented Architecture (SOA) and/or a Resource-Oriented Architecture (ROA) to access services.

Figure 18:
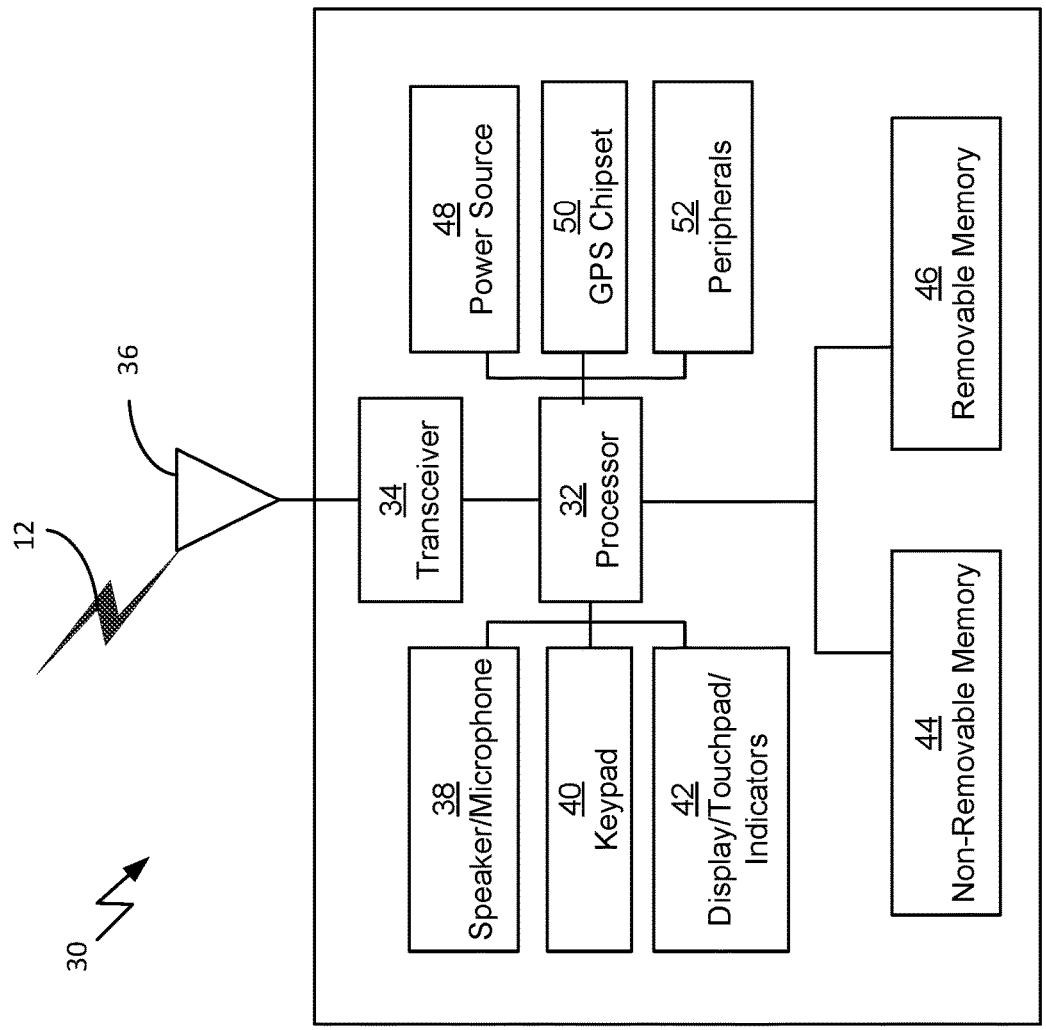
FIG. 18 is a system diagram of an example communication network node, such as an M2M/IoT/WoT device, gateway, or server that may be used within the communications system illustrated in FIGS. 16 and 17.

FIG. 18 is a block diagram of an example hardware/software architecture of a node of a network, such as one of the clients, servers, or proxies illustrated in FIGS. 1, 3-10, 12, 13, and 16-19, which may operate as an M2M server, gateway, device, or other node in an M2M network such as that illustrated in FIGS. 1, 3-10, 12, 13, and 16-17. As shown in FIG. 18, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements processes for communicating and managing service capabilities requirements and preferences, e.g., in relation to the methods described in reference to FIGS. 6-10 and 12-13 or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 18, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the methods described herein for communicating and managing service capabilities requirements and preferences herein, e.g., in relation to FIGS. 6-10 and 12-13, or in a claim. While FIG. 18 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 18 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 19:
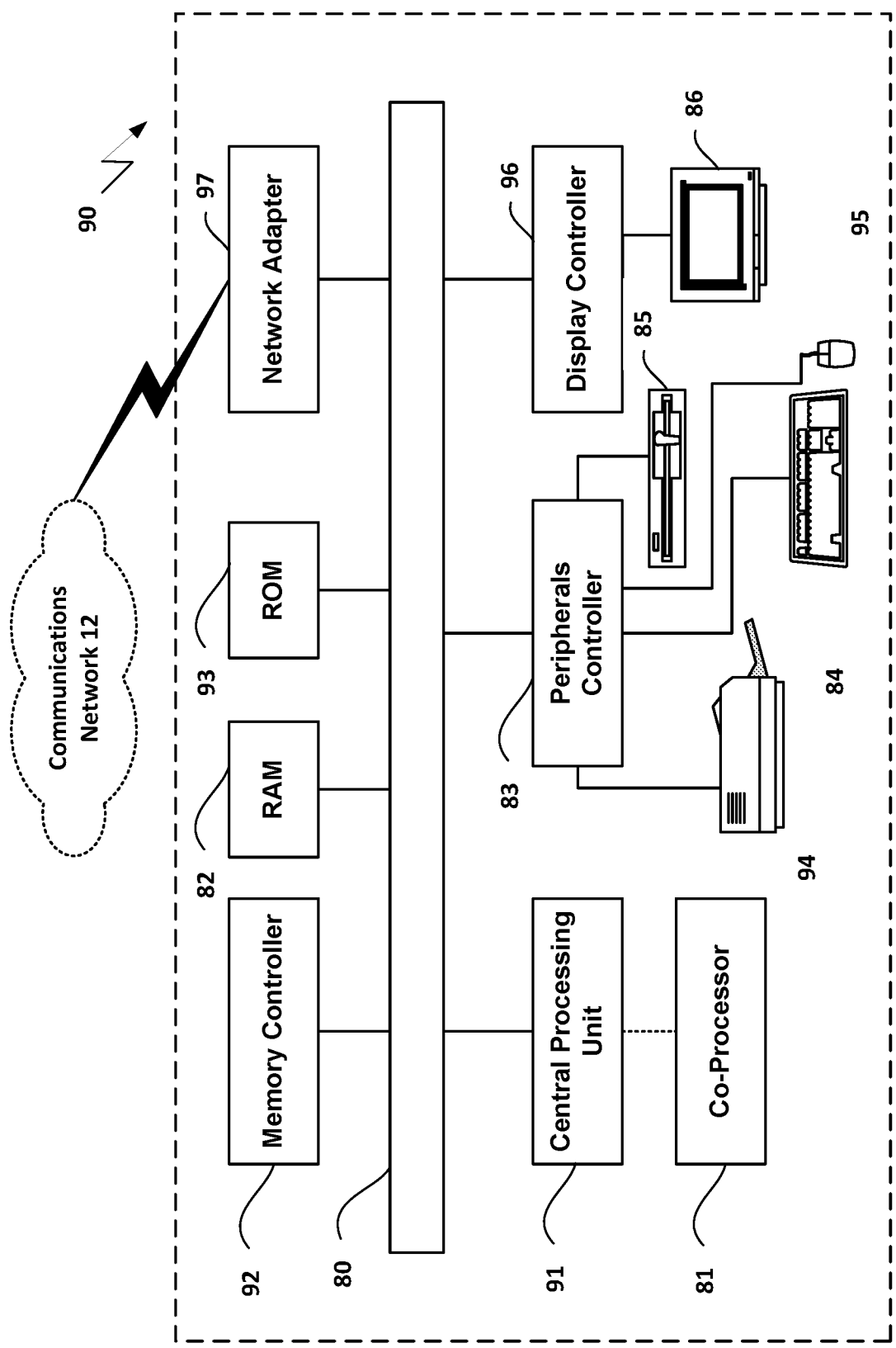
FIG. 19 is a block diagram of an example computing system in which a node of the communication system of FIGS. 16 and 17 may be embodied.

FIG. 19 is a block diagram of an exemplary computing system 90 which may also be used to implement one or more nodes of a network, such as the clients, servers, or proxies illustrated in FIGS. 1, 3-10, 12, 13, and 16-19, which may operate as an M2M server, gateway, device, or other node in an M2M network such as that illustrated in FIGS. 1, 3-10, 12, 13, and 16-17.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 1-4, to enable the computing system 90 to communicate with other nodes of the network.

We claim:

1. An apparatus, comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
   obtaining a service capability preference, the service capability preference pertaining to a service layer registree entity;
   determining, based at least in part on the service capability preference and capacities available to the registrar, whether the service capability preference can be fulfilled while meeting requirements of one or more other entities that were previously registered by the apparatus, wherein the one or more other entities include at least one entity that is not the service layer registree entity;

registering the service layer registree entity; and reserving a service capability based upon the service capability preference.

2. The apparatus of claim 1, wherein the instructions further cause the apparatus to perform operations comprising:

receiving the service capability preference from the service layer registree entity; and determining, based at least in part on potential impact on support of the one or more other entities, whether to register the service layer registree entity.

3. The apparatus of claim 2 wherein the service capability preference comprises:

an amount of computer memory, a bandwidth of central processing unit power, a frequency of operations to be performed, or a frequency of operations to be performed.

4. The apparatus of claim 3, wherein the service layer registree entity is a new registree.

5. The apparatus of claim 3, wherein the service layer registree entity is an existing registree.

6. The apparatus of claim 5, wherein the service capability preference is an updated preference.

7. The apparatus of claim 3, wherein the instructions further cause the apparatus to perform operations comprising:

determining, based at least in part on the service capability preference and capacities available to the registrar, to not register the service layer registree entity;

sending, to a server, a request to transfer registration to a new registrar gateway; and receiving, from the server, a response, the response identifying the new registrar gateway.

8. The apparatus of claim 7, wherein the instructions further cause the apparatus to perform operations comprising sending, based on the response, a request to the new registrar gateway to register the service layer registree entity.

9. The apparatus of claim 4, wherein the instructions further cause the apparatus to perform operations comprising:

receiving the service capability preference from a server; and determining, based at least in part on potential impact on support of the one or more other entities, whether to register the service layer registree entity.

10. The apparatus of claim 9, wherein the instructions further cause the apparatus to perform operations comprising:

determining, based at least in part on the service capability preference and capacities available to the registrar, to not register the service layer registree entity;

sending, to the server, a request to transfer registration to a new registrar gateway; and receiving, from the server, a response, the response identifying the new registrar gateway.

11. The apparatus of claim 1, wherein:

the service capability preference comprises a service capability requirement; and the instructions further cause the apparatus to determine, based at least in part on the service capability requirement, to decline to register the service layer registree entity.

12. A method performed by network equipment, the method comprising:

obtaining a service capability preference, the service capability preference pertaining to a service layer registree entity;

determining, based at least in part on the service capability preference and capacities available to the registrar, whether the service capability preference can be fulfilled while meeting requirements of one or more entities that were previously registered by the network equipment, wherein the one or more other entities include at least one entity that is not the service layer registree entity;

registering the service layer registree entity; and reserving a service capability based upon the service capability preference.

13. The method of claim 12, further comprising:

receiving the service capability preference from the service layer registree entity; and determining, based at least in part on potential impact on support of the one or more other registered entities, whether to register the service layer registree entity.

14. The method of claim 13 wherein the service capability preference comprises: an amount of computer memory, a bandwidth of central processing unit power, a frequency of operations to be performed, or a frequency of operations to be performed.

15. The method of claim 14, wherein the service layer registree entity is a new registree.

16. The method of claim 14, wherein the service layer registree entity is an existing registree.

17. The method of claim 16, wherein the service capability preference is an updated preference.

18. The method of claim 14, further comprising:

determining, based at least in part on the service capability preference and capacities available to the registrar, to not register the service layer registree entity;

sending, to a server, a request to transfer registration to a new registrar gateway; and receiving, from the server, a response, the response identifying the new registrar gateway.

19. The method of claim 18, wherein the instructions further cause the apparatus to perform operations comprising sending, based on the response, a request to the new registrar gateway to register the service layer registree entity.

20. The method of claim 15, wherein the instructions further cause the apparatus to perform operations comprising:

receiving the service capability preference from a server; and determining, based at least in part on potential impact on support of the one or more other entities, whether to register the service layer registree entity.

* * * * *